United States Patent
Xu et al.

(10) Patent No.: US 11,088,853 B2
(45) Date of Patent: *Aug. 10, 2021

(54) METHODS AND SYSTEMS FOR PKI-BASED AUTHENTICATION

(71) Applicant: Visa International Service Association, San Francisco, CA (US)

(72) Inventors: Minghua Xu, Austin, TX (US); Jose Rios Trevino, Austin, TX (US); Ying Hao, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 16/182,176

(22) Filed: Nov. 6, 2018

(65) Prior Publication Data

US 2019/0074979 A1   Mar. 7, 2019

Related U.S. Application Data

(63) Continuation of application No. 15/798,289, filed on Oct. 30, 2017, now Pat. No. 10,153,907, which is a
(Continued)

(51) Int. Cl.
*H04L 9/32* (2006.01)
*H04L 9/30* (2006.01)
(Continued)

(52) U.S. Cl.
CPC ............ *H04L 9/3263* (2013.01); *H04L 9/006* (2013.01); *H04L 9/3066* (2013.01);
(Continued)

(58) Field of Classification Search
CPC ......... G06F 21/30; G06F 21/64; H04L 9/006; H04L 9/3066; H04L 63/02;
(Continued)

(56) References Cited

U.S. PATENT DOCUMENTS

| 7,421,732 B2 | 9/2008 | Costa-Requena et al. |
| 7,620,980 B1 | 11/2009 | Wood et al. |

(Continued)

FOREIGN PATENT DOCUMENTS

| CN | 101001144 | 7/2007 |
| CN | 101075876 | 11/2007 |

(Continued)

OTHER PUBLICATIONS

Markovic, Data Protection Techniques, Cryptographic Protocols and PKI Systems in Modern Computer Networks, Jun. 30, 2017, IEEE, pp. 13-24.*

(Continued)

*Primary Examiner* — Luu T Pham
*Assistant Examiner* — Jenise E Jackson
(74) *Attorney, Agent, or Firm* — Kilpatrick Townsend & Stockton LLP

(57) ABSTRACT

Methods, systems, and devices are provided for authenticating API messages using PKI-based authentication techniques. A client system can generate a private/public key pair associated with the client system and sign an API message using the private key of the private/public key pair and a PKI-based cryptographic algorithm, before sending the signed API message to a server system. The server system (e.g., operated by a service provider) can authenticate the incoming signed API message using a proxy authenticator located in less trusted zone (e.g., a perimeter network) of the server system. In particular, the proxy authenticator can be configured to verify the signature of the signed API message using the public key corresponding to the private key and the same cryptographic algorithm. The authenticated API message can then be forwarded to a more trusted zone (e.g., an internal network) of the server system for further processing.

20 Claims, 11 Drawing Sheets

Related U.S. Application Data continuation of application No. 14/941,364, filed on Nov. 13, 2015, now Pat. No. 9,832,024.

(51) Int. Cl.
*H04L 29/06* (2006.01)
*H04L 9/00* (2006.01)

(52) U.S. Cl.
CPC .......... *H04L 9/3213* (2013.01); *H04L 9/3247* (2013.01); *H04L 9/3249* (2013.01); *H04L 9/3252* (2013.01); *H04L 9/3297* (2013.01); *H04L 63/0209* (2013.01); *H04L 63/0428* (2013.01); *H04L 63/105* (2013.01); *H04L 63/12* (2013.01); *H04L 63/168* (2013.01); *H04L 63/0218* (2013.01); *H04L 63/0823* (2013.01); *H04L 63/0884* (2013.01); *H04L 2209/56* (2013.01); *H04L 2209/76* (2013.01)

(58) Field of Classification Search
CPC ............ H04L 63/0884; H04L 63/0823; H04L 63/0218; H04L 63/168; H04L 63/12; H04L 63/0209; H04L 63/0428; H04L 63/105; H04W 12/06
USPC ........................................................ 713/178
See application file for complete search history.

(56) References Cited

U.S. PATENT DOCUMENTS

| | | |
|---|---|---|
| 7,962,512 B1 | 6/2011 | Sholtis et al. |
| 8,126,722 B2 | 2/2012 | Robb et al. |
| 9,100,171 B1* | 8/2015 | Peterson ............... H04L 9/3268 |
| 9,130,937 B1* | 9/2015 | Ostermann ............. H04L 63/10 |
| 9,832,024 B2 | 11/2017 | Xu et al. |
| 10,153,907 B2 | 12/2018 | Xu et al. |
| 2003/0120502 A1 | 6/2003 | Robb et al. |
| 2007/0136800 A1 | 6/2007 | Chan et al. |
| 2007/0180512 A1 | 8/2007 | Chaudhuri et al. |
| 2008/0022383 A1 | 1/2008 | Bobde et al. |
| 2008/0178264 A1 | 7/2008 | Keohane et al. |
| 2010/0313024 A1 | 12/2010 | Weniger et al. |
| 2011/0138457 A1* | 6/2011 | Jolfaei ................ H04L 63/0209 726/14 |
| 2011/0173443 A1 | 7/2011 | Osterwalder et al. |
| 2012/0179587 A1* | 7/2012 | Hill ........................ G06Q 30/04 705/34 |
| 2012/0179907 A1* | 7/2012 | Byrd ..................... H04L 9/3268 713/156 |
| 2013/0036308 A1 | 2/2013 | Buch et al. |
| 2013/0318344 A1 | 11/2013 | Brown et al. |
| 2014/0013123 A1* | 1/2014 | Khazan ................ H04L 63/061 713/189 |
| 2014/0047040 A1 | 2/2014 | Patiejunas et al. |
| 2014/0108442 A1 | 4/2014 | Paglia et al. |
| 2015/0082460 A1 | 3/2015 | Amiga |
| 2015/0135264 A1 | 5/2015 | Amiga |
| 2017/0141926 A1 | 5/2017 | Xu et al. |
| 2019/0087432 A1* | 3/2019 | Sion .................... H04L 63/0428 |

FOREIGN PATENT DOCUMENTS

| | | |
|---|---|---|
| CN | 101136748 | 3/2008 |
| EP | 2157759 | 2/2010 |
| WO | 2011/141579 | 11/2011 |
| WO | 2017/083071 | 5/2017 |

OTHER PUBLICATIONS

Laganier et al, HIPernet: A Decentralized Security Infrastructure for Large Scale Grid Environments, Nov. 13, 2005, IEEE, pp. 140-147.*
Calyam et al., "Wide-area Overlay Networking to Manage Science DMZ Accelerated Flow", IEEE, 2014, pp. 269-275, 17 pages.
Ghatak et al., "Intelligent Wall Mounted Wireless Fencing System Using Wireless Sensor Acuator Network", International Conference on Computer Communication and Informatics, Jan. 5, 2014, pp. 1-5.
European Search Report dated Aug. 18, 2018 for European Patent Application No. 16864748.5, 11 pages.
International Search Report and Written Opinion dated Jan. 19, 2017 for PCT Application No. PCT/US2016/057744, 17 pages.
Shaikh et al., "Disarming Firewall", IEEE, 2010, pp. 1-6.
Sparks et al., "A Chipset Level Network Backdoor: Bypassing Host-Based Firewall and IDS", ACM, Mar. 12, 2009, pp. 125-134.
Application No. CN201680066079.5 , Office Action, dated Oct. 28, 2020, 27 Pages.
Application No. SG11201802678U , Notice of Decision to Grant, dated Dec. 22, 2020, 5 pages.
EP16864748.5 , "Office Action", dated Mar. 25, 2019, 5 pages.
SG11201802678U , "Written Opinion", dated Jan. 22, 2020, 8 pages.
EP16864748.5 , "Office Action", dated Sep. 4, 2018, 7 pages.
EP16864748.5 , "Office Action", dated Nov. 6, 2019, 10 pages.
EP16864748.5 , "Office Action", dated Jun. 16, 2020, 9 pages.

* cited by examiner

METHODS AND SYSTEMS FOR PKI-BASED AUTHENTICATION

This application is a continuation application of U.S. patent application Ser. No. 15/798,289, filed Oct. 30, 2017, titled METHODS AND SYSTEMS FOR PKI-BASED AUTHENTICATION, which is a continuation application of U.S. patent application Ser. No. 14/941,364, filed Nov. 13, 2015, titled METHODS AND SYSTEMS FOR PKI-BASED AUTHENTICATION. The entire contents of the above applications are hereby incorporated by reference for all purposes in its entirety.

BACKGROUND

Client authentication is critical for maintaining the integrity and security of electronic transactions and communications. However, existing authentication techniques can suffer from certain drawbacks. For example, a keyed-hash message authentication code (HMAC) protects the integrity and authenticity of a message via a cryptographic hash function in combination with a secret cryptographic key. However, the secret key must be shared between the sender and the receiver of the message, thus increasing the risk of leakage of the key. Also, solutions based on public key infrastructure (PKI) such as mutual SSL are typically expensive to setup and maintain because such solutions typically require the maintenance of both private and public keys in a relatively insecure environment, such as a perimeter network. Furthermore, solutions like mutual SSL implement authentication at a level below the application level, making it difficult for higher-level applications to map a subject in such solutions to a principal that needs to be authenticated.

Embodiments of the present invention address these problems and other problems individually and collectively.

BRIEF SUMMARY

Embodiments are provided for authenticating API messages using PKI-based authentication techniques. According to some embodiments, a computer-implemented method is provided. The method comprises receiving, by a first computer in a first low security zone of a first system, a first application programming interface (API) message from a second system for a first service provided by the first system, the first system comprising a first high security zone behind a first firewall and the first low security zone in front of the first firewall, the second system comprising a second high security zone behind a second firewall and a second low security zone in front of the second firewall, the first API message generated by a second computer in the second high security zone of the second system using a cryptographic algorithm and a private key associated with the second system, authenticating, by the first computer in the first low security zone of the first system, the first API message using the cryptographic algorithm and a public key that corresponds to the private key associated with the second system, and transmitting the authenticated first API message to a third computer in the first high security zone of the first network.

In some embodiments, the first API message can comprise a key identifier associated with the public key, and authenticating the first API message can comprise retrieving the public key using the key identifier. The cryptographic algorithm can comprise RSA-SHA2 or elliptic curve digital signature algorithm (ECDSA).

The cryptographic algorithm can comprise a hash function and a decryption function, and authenticating the first API message can comprise obtaining a signature token from the first API message, generating data to sign based on the first API message, applying the hash function to the data to sign to obtain a hash, applying the decryption function to at least a portion of the signature token and the public key to obtain decrypted signature data, and determining whether the hash matches the decrypted signature data.

The first API message can comprise a method, a resource identifier, a message header, and a message body, and generating the data to sign based on the first API message can comprise obtaining a timestamp from the signature token, obtaining a header hash of at least a portion of the message header, obtaining a body hash of at least a portion of the message body, and combining the timestamp, the header hash, the body hash, the method and the resource identifier to generate the data to sign.

Authenticating the first API message can comprise verifying a timestamp associated with the first API message to ensure that the first API message is received within a predetermined threshold amount of time from a time indicated by the timestamp.

The first API message can comprise a key identifier and authenticating the first API message can comprise retrieving one or more allowable network addresses using the key identifier, and verifying that a network address associated with the first API message is included in the one or more allowable network addresses.

The third computer in the first high security zone of the first network can be configured to decrypt at least a portion of the authenticated first API message using a shared secret to obtain decrypted message data and to validate the decrypted message data. The third computer in the first high security zone of the first network can be further configured to route the authenticated first API message to a fourth computer in the first high security zone of the first network that implements the first service provided by the first system.

A second API message that corresponds to the first API message can be generated, by a fifth computer in the first high security zone of the first network, using the cryptographic algorithm and a private key associated with the first system. The second API message can be authenticated by a sixth computer in the second low security zone of the second system using a public key that corresponds to the private key associated with the first system.

According to embodiments, a first computer system is provided. The first computer system comprising a first computer in a first high security zone of the first system, the first computer comprising one or more processors configured to generate a first application programming interface (API) message for a second computer system, the first computer system comprising the first high security zone behind a first firewall and a first low security zone in front of the first firewall, the second computer system comprising a second high security zone behind a second firewall and a second low security zone in front of the second firewall, the first API message being generated using a cryptographic algorithm and a first private key associated with the first computer system, and provide a first public key that that corresponds to the first private key associated with the first computer system to the second computer system, wherein the first public key is used by a second computer in the second low security zone of the second computer system to authenticate the first API message; and a third computer in the first low security zone of the first computer system, the third computer comprising one or more processors configured to receive a second API message from the second computer system, the second API message being generated by a fourth computer in the second high security zone of the second computer system using the cryptographic algorithm and a second private key associated with the second computer system, and authenticate the second API message using the cryptographic algorithm and a second public key that corresponds with the second private key associated with the second computer system.

In some embodiments, generating the first API message can comprise generating a digital signature of the first API message using the cryptographic algorithm and the first private key. The one or more processors of the first computer can be further configured to receive a first key identifier associated with the first public key from the second computer system, wherein the first key identifier is included in the first API message. The one or more processors of the first computer can be further configured to encrypt at least a portion of first API message using a shared secret.

The first computer system can further comprise a fifth computer comprising one or more processors configured to receive the second public key from the second computer system; and provide a second key identifier associated with the second public key to the second computer system, wherein the second key identifier is included in the second API message. The one or more processors of the fifth computer can be further configured to provide a notification to the second computer system regarding expiration of the second public key. Authenticating the second API message can comprise obtaining, by the third computer, the second key identifier from the second API message and retrieving the second public key using the second key identifier.

The one or more processors of the third computer can be further configured to transmit the authenticated second API message to a sixth computer in the first high security zone of the first computer system, the sixth computer being configured to decrypt at least a portion of the authenticated second API message using a shared secret.

According to some embodiments, a computer system is provided. The computer system comprises a memory that stores computer-executable instructions; and one or more processors in a low security zone of the computer system, the low security zone being in front of a firewall of the computer system, the one or more processors configured to access the memory and execute the computer-executable instructions to at least: receive an authorization request from a client of the computer system, the authorization request comprising one or more user credentials of the client; transmit the authorization request to a second computer in a high security zone of the computer system, the high security zone behind the firewall of the computer system; receive from the second computer in the high security zone an authorization response comprising an authorization token that is signed using a cryptographic algorithm and a private key associated with the computer system; transmit the authorization response to the client; receive a service request from the client, the service request comprising the signed authorization token; authenticate the service request by verifying the signed authorization token using the cryptographic algorithm and a public key that corresponds to the private key associated with the computer system; and transmit the authenticated service request to a third computer in the first high security zone of the computer system, the third computer configured to further process the service request.

In some embodiments, the second computer can be configured to encrypt the authorization token using a shared secret and the third computer can be configured to decrypt the authorization token using the shared secret.

These and other embodiments of the invention are described in further detail below.

TERMS

Figure 1:
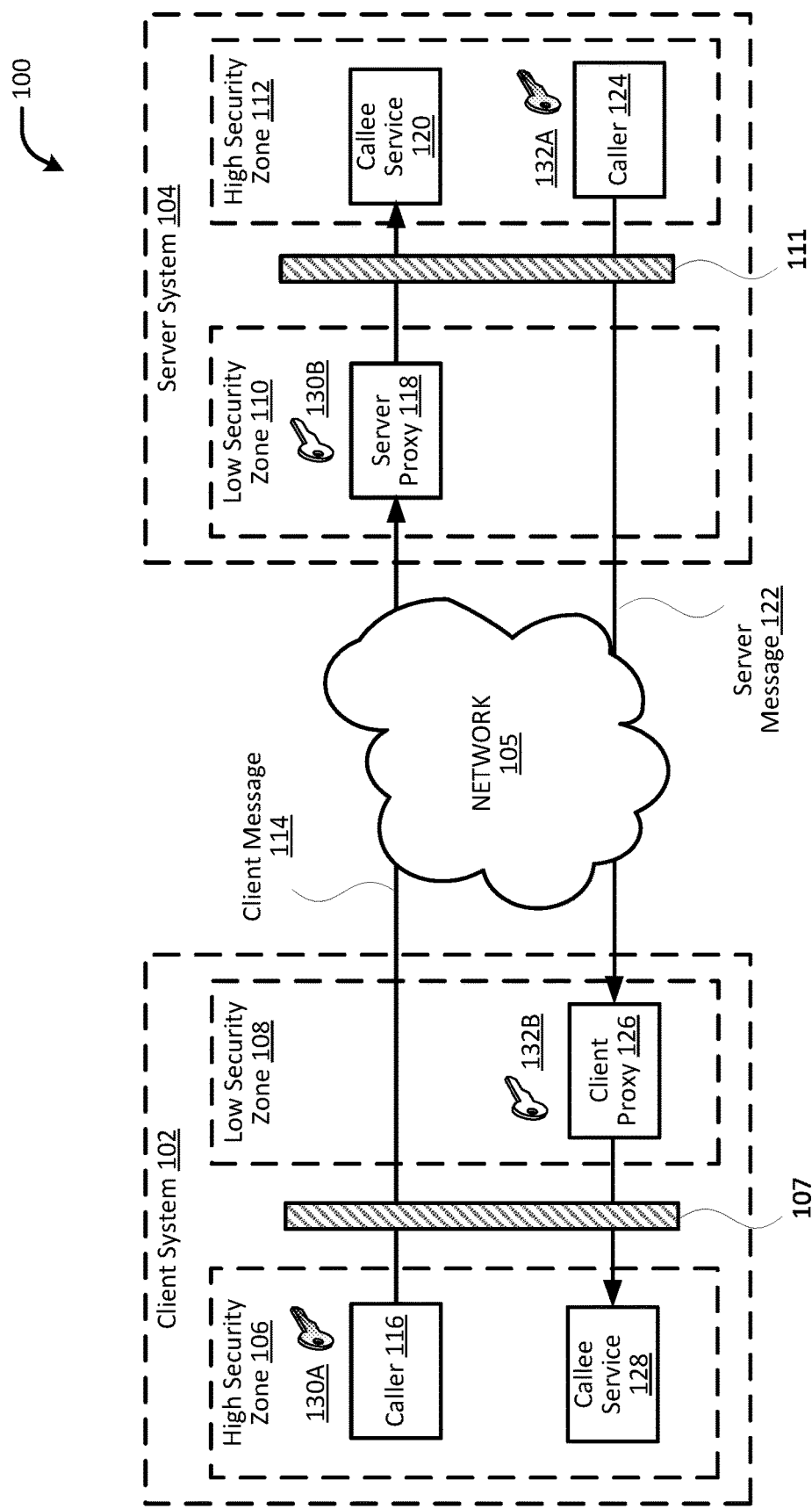
FIG. 1 illustrates an example system for implementing PKI-based message authentication, in accordance with embodiments.

Prior to discussing embodiments of the invention, description of some terms may be helpful in understanding embodiments of the invention.

The term "private/public key pair" or "public/private key pair" may include a pair of linked cryptographic keys generated by an entity. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature," "signature," or "digest" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" may refer to an attestation of the authenticity of some information. For example, a key certificate can be an electronic document used to prove the authenticity and/or ownership of a key. A public key certificate can be used to prove ownership of a public key. A certificate can be issued by a certificate authority, which is a trusted entity that verifies the certificate's contents. A certificate can include the key itself along with information about the key, information about its owner's identity, and the digital signature of an entity that has verified the certificate's contents are correct. For example, the certificate can include a subject (the person or entity identified), an issuer, an expiration date, a valid from date (the date the certificate is first valid from), a purpose of the key (e.g., encryption, signature), the signature and signature algorithm, and the like. A certificate can be in any suitable format such as X.509.

A "firewall" may refer to any software and/or hardware based security barrier between a relatively more trusted or secure network (e.g., an organization's internal network) and a relatively less trusted or secure network (e.g., the Internet). Firewalls can include hardware based network firewall appliances (e.g., routers) that filter traffic between two or more networks. Firewalls can also include host-based firewalls that provide a layer of software on a host that controls network traffic in and/or out of the host machine. In some embodiments, a firewall can include a secure hardware element that can be used to protect data stored therein from unauthorized access. In various embodiments, firewalls can be configured to monitor and control incoming or outgoing network traffic based on predetermined security rules. The firewalls can control network traffic by enforcing the security rules at any suitable layer of communication, such as at the network layer, the transport layer, the application layer, or the like. The firewalls can be configured to provide protection for any suitable entity or entities such as one or more processes, applications, computing devices, networks, and the like.

An application programming interface (API) message can include a message between a first entity (e.g., a client) and a second entity that provides a resource or service to the first entity (e.g., a service provider). The resource or service may be utilized via an API (e.g., a web-based interface) through which the first and the second entity interact. An API message can include an API request message or an API response message. For example, an API request message can be used by a client to request the service provider by a service provider. An API response message can be used by the service provider to provide the result of the service to the client. In some embodiments, the API messages can be communicated over the Hypertext Transfer Protocol (HTTP) with HTTP verbs or methods such as GET, POST, PUT, DELETE, etc. In some embodiments, the APIs (RESTful APIs) and systems (RESTful systems) may conform to a set of constraints of the Representational State Transfer (REST) architecture style. REST interfaces typically include resources, identified by resource identifiers (e.g., uniform resource identifiers (URIs)), which may be accessed using standard HTTP verbs or methods.

DETAILED DESCRIPTION

Methods, systems, and devices are provided for authenticating API messages using PKI-based authentication techniques. According to an aspect of the present invention, embodiments for signing and verification of API messages are provided. A client system can generate a private/public key pair associated with the client system and sign an API message (e.g., an API request) using the private key of the private/public key pair and a PKI-based cryptographic algorithm, such as RSA-SHA2, elliptic curve digital signature algorithm (ECDSA), or any other suitable algorithms, before sending the signed API message to a server system. Such message signing can be performed by an application in a trusted zone of the client system. The server system (e.g., operated by a service provider) can authenticate the incoming signed API message using a proxy authenticator located in less trusted zone (e.g., a perimeter network) of the server system. In particular, the proxy authenticator can be configured to verify the signature of the signed API message using the public key corresponding to the private key and the same cryptographic algorithm. The authenticated API message can then be forwarded to a more trusted zone (e.g., an internal network) of the server system for further processing. For instance, the authenticated API message can be further validated (e.g., decrypted using a shared secret and verified) and/or routed to a server (located in a trusted zone of the server system) implementing a service requested by the API message.

Similarly, the server system can sign an API message intended for the client system using a private key of associated with the server system. The client system can authenticate the signed API message using a proxy authenticator located in a less trusted zone (e.g., a perimeter network) of the client system, before forwarding the authenticated API message to a more trusted zone (e.g., an internal network) of the client system for further processing. Further details of such message authentication embodiments are discussed in FIGS. 1-6.

Embodiments can provide several advantages over existing techniques. For instance, the API message can be generated and/or signed by a client component that is located in a trusted zone of the client system, thereby reducing the cost of maintaining sensitive information (e.g., private key) in a less trusted zone (e.g., perimeter network) of the client system. Additionally, such an API message can be signed at the application level to facilitate cryptographic identification of authentication principals at the application level. As another example, verification of the integrity and authenticity of the API message terminates at a less trusted zone (e.g., perimeter network) of the server system, thus providing protection for the more trusted zone (e.g., internal network) of the server system. The authentication can be performed without requiring sensitive information (e.g., a private key or shared secret), thereby eliminating the cost of securing such sensitive data in the less trusted zone.

According to another aspect of the present invention, embodiments for signing and verification of authorization tokens included in API messages are provided. Such embodiments may be more suitable for clients that are not capable of implementing direct message signing techniques discussed above. In some cases, the clients may not be capable of securely storing sensitive cryptographic keys (e.g., private key) required for signing client messages. For instance, such clients may not be equipped with any software or hardware based security module (e.g., hardware security module (HSM), smart card, chip card). Alternatively or additionally, the clients may not be sufficiently protected from external traffic by firewalls or perimeter networks. In some other cases, the clients may not be equipped with the computing resources (e.g., CPU, memory) for implementing cryptographic algorithms required for digital signing. Examples of such clients can include web-based applications (e.g., browsers), mobile applications not supported by security modules, and the like.

A client can send an authorization request to a server system to request an authorization token. The authorization request can include user credentials, such as username and password. In response, the server system can be configured to authenticate the user credentials and generate an authorization token that encapsulates the authentication results, access rights, and other information related to the authentication of the user credentials. The authorization token can be signed, by a component running in a trusted zone of the server system, using a private key of a private/public key pair associated with the server system. In some cases, the authorization token may be encrypted before being signed. Subsequently, the client can send a service request (e.g., an API request) to the server system, the service request including the authorization token. The service request can be authenticated by a proxy authenticator located in a less trusted zone (e.g., perimeter network) of the server system using the public key that corresponds to the private key used to sign the authorization token. In particular, the proxy authenticator can be configured to verify the signature of the signed authorization token using the public key. Authenticated service request can then be forwarded to the trusted zone of the server system for further processing. For example, the encrypted authorization token can be decrypted and validated by a component in the trusted zone. As another example, the service request can be routed to a component implementing the service or resource requested by the service request.

Benefits of the token authentication embodiments are similar to those for the message authentication embodiments. In particular, verification of the integrity and authenticity of the API message terminates at a less trusted zone (e.g., perimeter network) of the server system, providing protection for the more trusted zone (e.g., internal network) of the server system. The authentication of the API message can be performed without requiring sensitive information (e.g., a private key or shared secret), thereby eliminating the cost of securely storing such sensitive data in the less trusted zone. Further details of such message authentication embodiments are discussed in FIGS. 7-10.

I. PKI-Based Message Authentication Systems

FIG. 1 illustrates an example system 100 for implementing PKI-based message authentication, in accordance with embodiments. The client system 102 can be configured to transmit a message to the server system 104 to utilize a service provided by the server system 104. Likewise, the server system 104 can be configured to transmit a message to the client system 102 in response to a client request or to request a service provided by the client system 102. The messages can be authenticated using the PKI-based techniques discussed herein to enhance integrity and security of the messages.

Examples of the server system 104 can be provided by a payment processor, an issuer, or any other service providers. The server system 104 can be configured to provide various services that may be exposed via APIs (e.g., web service interfaces). For example, a payment processor may provide services for tokenizing account information (e.g., primary account number (PAN)), enrolling payment accounts (e.g., credit card or debit card accounts) for payment transactions, provisioning or replenishing account parameters used for conducting transactions (e.g., PAN or token, expiration time, cryptographic keys or key materials to the generation of cryptograms) and the like. In some examples, client system 102 can be provided by a merchant, a partner, an electronic wallet provider, or other clients of the services provided by the server system 104.

The client system 102 and the server system 104 may each comprise two or more physical or logical network zones, each associated with a different level of network security or trustworthiness. For instance, as illustrated in FIG. 1, the client system 102 comprises a high security zone 106 and a low security zone 108. The server system 104 comprises a low security zone 110 and a high security zone 112. Typically, less trusted security zones (with lower security levels) are located closer to external traffic than more trusted security zones (with higher security levels). For instance, a low security zone may include a perimeter network or a demilitarized zone (DMZ) that contains and exposes a system's external-facing services to a larger and untrusted network, such as the Internet. In some cases, a low security zone may be protected by a firewall from the external untrusted network. The protection may minimal, however, compared with the protection for a higher security zone. A higher security zone may include an internal network protected by a lower security zone and/or one or more intervening firewalls between the higher security zone and the lower security zone. In various embodiments, the higher security zones may be protected by more layers of firewalls (e.g., implemented in hardware and/or software) than the lower security zones.

As illustrated in FIG. 1, the low security zone 108 of the client system 102 is configured to directly interface with traffic from the external network 105 (e.g., the Internet). In some cases, the low security zone 108 may be protected by one or more firewalls (not shown) that are situated between the low security zone 108 and the external network 105. The low security zone 108 may be situated between the external network and a high security zone 106 of the client system 102, such that the network traffic is monitored or filtered before reaching the high security zone 106. In some cases, the high security zone 106 can be situated behind and therefore further protected by one or more intervening firewalls 107 between the low security zone 108 and the high security zone 106. Thus, the low security zone 108 can be situated in front of and therefore not protected by the intervening firewalls 107. In some cases, such intervening firewalls 107 are optional and the low security zone 108 acts as a firewall for the high security zone 106. In some embodiments, the client system 102 can include three or more security zones with increasing insulation from the external network traffic and thus increasing levels of network security associated with the security zones.

Similarly, the low security zone 110 of the server system 102 is configured to directly interface with traffic from the external network 105 (e.g., the Internet). In some cases, the low security zone 110 may be protected by one or more firewalls (not shown) that are situated between the low security zone 110 and the external network 105. The low security zone 110 may be situated between the external network and a high security zone 112 of the server system 104, such the network traffic is monitored or filtered before reaching the high security zone 112. In some cases, the high security zone 112 can be situated behind and therefore further protected by one or more intervening firewalls 111 between the low security zone 110 and the high security zone 112. Thus, the low security zone 110 can be situated in front of and therefore not protected by the intervening firewalls 111. In some cases, such intervening firewalls 111 are optional and the low security zone 110 acts as a firewall for the high security zone 112. In some embodiments, the server system 104 can include three or more security zones with increasing insulation from the external network traffic and thus increasing levels of network security.

The client system 102 and the server system 104 can each comprise various components that are located in different security zones. For instance, as illustrated in FIG. 1, the client system 102 comprises a caller component 116 and a callee service component 128 that are located in a high security zone 106, as well as a client proxy 126 that is located in a low security zone 108. The server system 104 comprises a caller component 124 and a callee service component 120 that are located in a high security zone 112, as well as a server proxy 118 that is located in a low security zone 110.

The components may be implemented, collectively or individually, by one or more computing devices such as servers, mobile devices, and the like. In some embodiments, two different components in the same or two different security zones may be implemented by two different computing devices. Alternatively, two different components in the same or two different security zones may be implemented by a single computing device. For example, the component in a higher security zone may be implemented using a secure hardware element of the computing device and/or protected by application-specific or process-specific firewall implemented in software running on the computing device; whereas the component in a lower security zone may be implemented using a less secure hardware element of the computing device and/or not protected by the software firewalls of the computing device.

The client system 102 can be configured to generate or otherwise have access to a private/public key pair associated with the client system 102. A caller component 116 located in the high security zone 106 of the client system 102 can generate a client message 114 directed to the server system 104. For example, the caller component 116 may include a payment application configured to generate an API request message 114 utilize a tokenization service provided by a payment processing network 104. The caller component 116 can be configured to sign the client message using a cryptographic algorithm and a private key 130A of the client system's private/public key pair. For instance, the cryptographic algorithm can include a hash function that is used to generate a hash of some or all data included in the client message. The hash may then be encrypted using the private key 130A to generate an encrypted hash. The encrypted hash may be used as a digital signature for the client message 114. The digital signature along with other optional information (e.g., request time stamp) may be included in a signature token that is included in the signed client message 114. For instance, the signature token can be included as a header field in the signed client message 114. The information included in the signature token can be used by the server system 104 to authenticate the client message 114.

The private key 130A of the client system 102 is protected against leakage because it is not used or accessed by a component in a lesser secure zone such as the low security zone 108 of the client system 102. The risk is exposure is further reduced because the private key 130A is not shared with the server system 104. Rather, the client system 102 can be configured to provide the public key 130B that corresponds with private key 130A to the server system 104. In some embodiments, the public key certificate (e.g., X.509 certificate) containing the public key 130B may be provided instead of just the public key 130B itself. This can allow the server system 104 to manage the public keys. For example, the server system 104 may be configured to provide notifications to client systems regarding keys that are near expiration or keys that have expired, without asking the client systems to separately provide key expiration information. Additionally, using certificates can facilitate mutual agreement of the subject in the certificates between the client system and the server system when the certificates are uploaded to and/or downloaded from the server system. For certain signing algorithms that are more involved in the exchange of the algorithm and the parameters (e.g., ECC-based signing algorithms), managing such information at the certificate level can be more explicit than at the public key level.

In some embodiments, the public key 130B associated with the client system's private key 130A (or the public key certificate thereof) may be provided to the server system 104 at any suitable time. For example, such information can be provided to the server system before the transmission of the signed client message 114. For instance, the public key (or the public key certificate thereof) may be uploaded to the server system 104 via a portal service provided by the server system 104 at a prior point in time or transmitted to the server system 104 in a previous client message. In some embodiments, the public key can be identified by a key identifier (key ID). The key ID may be issued by the server system 104 when the public key (or the public key certificate thereof) is provided to the server system 104. Subsequently, the key ID may be transmitted as part of the client message to the server system to facilitate the retrieval of the public key (or the public key certificate thereof) associated with the key ID. In other embodiments, the public key (or the public key certificate thereof) may be provided to the server system 104 in the same signed client message 114. In yet other embodiments, the public key (or the public key certificate thereof) may be provided to the server system 104 after the transmission of the signed client message 114.

The signed client message 114 can be transmitted to the server system 104 via a network 105 (e.g., the Internet) and received by a server proxy 118 in a low security zone 110 of the server system 104 as an inbound message. From the client system's point of view, the client message 114 is an outbound message; from the server system's point of view, the client message 114 is an inbound message. The low security zone 110 may include a perimeter subnetwork or a DMZ of the server system 104. The server proxy 118 can be configured to authenticate the signed client message 114 using the same cryptographic algorithm as used by the caller component 116 of the client system 102, along with the public key 130B that corresponds with the private key 130A used to sign the client message. In some cases, the public key 130B may be retrieved using a key ID that is provided as part of the client message 114.

To authenticate the signed client message 114, the signature token can be extracted from the signed client message 114. A digital signature can be extracted from the signature token. The digital signature and the public key 130B can be used as inputs into a decryption function to generate decrypted data. The decryption function corresponds with the encryption function that was used by the caller component 116 of the client system 102 to generate the signed client message 114, discussed above. Some or all data included from the client message can be used to construct the verification data to sign. The verification data to sign can be hashed to generate a verification hash using the same hash function that was used by the caller component 116 of the client system 102. The verification hash may be compared with the decrypted data. If there is a match, then the authenticity as well as the integrity of the client message can be ensured. If there is not a match, an error message may be returned to the client system 102.

In some embodiments, some pre-validation operations can be optionally performed (e.g., by the server proxy 118) to validate the signed client message before verification of message signature. For instance, a request timestamp may be extracted from the client message and validated to ensure that a predetermined threshold of time (e.g., eight minutes) has not lapsed since the request timestamp. If the predetermined threshold has lapsed, then an error message may be returned to the client system 102. Additionally or alternatively, a network address of the client system 102 (e.g., the IP address of a computer implementing the caller component 116) may be verified against a predetermined whitelist or blacklist containing, respectively, allowable or restricted client network addresses. In some cases, the whitelist or blacklist may be selected based on a key ID or some other information included in the client message.

Once authenticated, the authenticated client message 115 may be forwarded to other components in the low security zone 110 and/or in the high security zone 112 for further processing. For example, the authenticated client message can be forwarded to a callee service component 120 in the high security zone 112 that implements a service requested by the client message 114. As another example, the authenticated client message can be forwarded to a validation/authentication component in the high security zone 112 that further validates the client message. For instance, in some embodiments, some or all portions of the client message may be encrypted (e.g., using a secret key shared between the client system and the server system) prior to being signed. In such embodiments, the validation/authentication component in the high security zone 112 may be configured to decrypt client message using the shared secret key. As yet another example, the authenticated client message can be forwarded to a routing component in the low security zone 110 or the high security zone 112 that determines the next component to forward the authenticated client message to, for example, based on the type of service requested, the characteristics of the client system, the workload of the server components, and the like.

Additionally, server messages from the server system 104 to the client system 102 can be signed and authenticated in a similar manner as for the client messages discussed above to achieve mutual authentication of client/server messages. The server system 104 can be configured to generate or otherwise have access to a private/public key pair associated with the server system 104. A caller component 124 located in the high security zone 112 of the server system 104 can generate a signed server message 122 directed to the client system 102. A server message can include an API request message that is used to call or invoke a service provided by the client system 102. Alternatively, the server message may include an API response message corresponding to an API request message from the client system 102. For example, the caller 124 can include a notification service that sends post back API calls to the client system 102 to notify the client system 102 of predetermined triggering events, such as events related the authorization of transaction requests, enrollment of payment accounts in electronic wallet applications, tokenization of account information, and the like.

The caller component 124 of the server system 104 can be configured to sign the client message using a cryptographic algorithm and a private key 132A of the server system's private/public key pair. For instance, the cryptographic algorithm can include a hash function that is used to generate a hash of some or all data included in the server message. The hash may then be encrypted using the private key 132A to generate an encrypted hash. The encrypted hash may be used as a digital signature for the server message 122. The digital signature along with other optional information (e.g., request time stamp) may be included in a signature token that is included in the signed server message 122. For instance, the signature token can be included as a header field in the signed server message 122. The information included in the signature token can be used by the client system 102 to authenticate the server message 122.

The private key 132A of the server system 104 is protected against leakage because it is not used or accessed by a component in a lesser secure zone such as the low security zone 110 of the server system 104. The risk of exposure is further reduced because the private key 132A is not shared with the client system 102. Rather, the server system 104 can be configured to provide the public key 132B that corresponds with private key 132A to the client system 102. In some embodiments, the public key certificate (e.g., X.509 certificate) containing the public key 132B may be provided instead of just the public key 132B itself. This can allow the client system 102 to manage the public keys (e.g., providing notifications related to key expiration) and/or to achieve mutual agreement of the subject in the certificate with the server system.

In some embodiments, the public key 132B (or the public key certificate thereof) associated with the server system's private key 132A may be provided to the client system 102 at any suitable time. For example, such information may be provided to the client system 102 before the transmission of the signed server message 122. For instance, the public key (or the public key certificate thereof) may be made available for download from a portal service provided by the server system 104. Alternatively, the public key (or the public key certificate thereof) may be transmitted to the client system 102 in a previous server message. In some embodiments, the public key may be identified by a key identifier (key ID). The key ID may be assigned by the server system 104 or the client system 102 when the public key (or the public key certificate thereof) is provided to the client system 104. Subsequently, the key ID may be transmitted as part of the server message to the client system to facilitate the retrieval of the public key (or the public key certificate thereof) associated with the key ID. In some other embodiments, the public key (or the public key certificate thereof) may be provided to the client system 102 in the same signed server message 122. In yet some other embodiments, the public key (or the public key certificate thereof) may be provided to the client system 102 after the transmission of the signed server message 122.

The signed server message 122 can be transmitted to the client system 102 via a network 105 (e.g., the Internet) and received by a client proxy 126 in a low security zone 108 of the client system 102 as an inbound message. From the server system's point of view, the server message 122 is an outbound message; from the client system's point of view, the server message 122 is an inbound message. The low security zone 108 may include a perimeter subnetwork or a DMZ of the client system 102. The client proxy 126 can be configured to authenticate the signed server message 122 using the same cryptographic algorithm as used by the caller component 124 of the server system 104 and the public key 132B that corresponds with the private key 132A used to sign the client message. In some cases, the public key 132B may be retrieved using a key ID that is provided as part of the server message 122.

To authenticate the signed server message 122, the signature token can be extracted from the signed server message 122. A digital signature can be extracted from the signature token. The digital signature and the public key 132B can be used as inputs into a decryption function to generate decrypted data. The decryption function corresponds with the encryption function that was used by the caller component 124 of the server system 104 to generate the signed server message 122, discussed above. Some or all data included from the server message can be used to construct the verification data to sign. The verification data to sign can be hashed to generate a verification hash using the same hash function that was used by the caller component 124 of the server system 104. The verification hash may be compared with the decrypted data. If there is a match, then the authenticity as well as the integrity of the server message can be ensured. If there is not a match, an error message may be returned to the server system 104.

In some embodiments, some pre-validation operations can be optionally performed (e.g., by the client proxy 126) to validate the signed server message before its signature is authenticated using the cryptographic algorithm and the public key. For instance, a request timestamp may be extracted from the server message and validated to ensure that a predetermined threshold of time (e.g., eight minutes) has not lapsed since the request timestamp. If the predetermined threshold has lapsed, then an error message may be returned to the server system 104. Additionally or alternatively, a network address of the server system 104 (e.g., the IP address of a computer implementing the caller component 124) may be verified against a predetermined whitelist or blacklist containing, respectively, allowable or restricted server network addresses. In some cases, the predetermined whitelist or blacklist may be selected based on a key ID or some other information included in the server message.

Once authenticated, the authenticated server message may be forwarded to other components in the low security zone 108 and/or in the high security zone 106 for further processing. For example, the authenticated client message can be forwarded to a callee service component 128 in the high security zone 106 that implements a service requested by the server message 122. As another example, the authenticated client message can be forwarded to a validation/authentication component in the high security zone 106 that further validates the server message. For instance, in some embodiments, some or all portions of the server message may be encrypted (e.g., using a secret key shared between the client system and the server system) prior to being signed. In such embodiments, the validation/authentication component in the high security zone 106 may be configured to decrypt server message using the shared secret key. As yet another example, the authenticated server message can be forwarded to a routing component in the low security zone 108 or the high security zone 106 that determines the next component to forward the authenticated server message to, for example, based on the type of service requested, the characteristics of the server system, the workload of the client components, and the like.

The authentication system discussed in FIG. 1 can protect the integrity of client and/or server messages and allows the messages to be authenticated without the exchange of secret or private keys between the client and server systems, thereby reducing the risk of exposure of the secret or private keys and reducing the cost associated with protecting and maintaining sensitive information (e.g., shared secrets and/or private keys) in the perimeter network zones of the systems. Additionally, embodiments can allow applications running in a high security zone to initiate and sign API messages at the application level, making it easier for applications to cryptographically identify the principals that are authenticated. Furthermore, authentication of inbound traffic terminates at low security zones (e.g., perimeter zones) such that only authenticated or trusted traffic flows toward higher security zones, thereby protecting security of internal networks.

Figure 2:
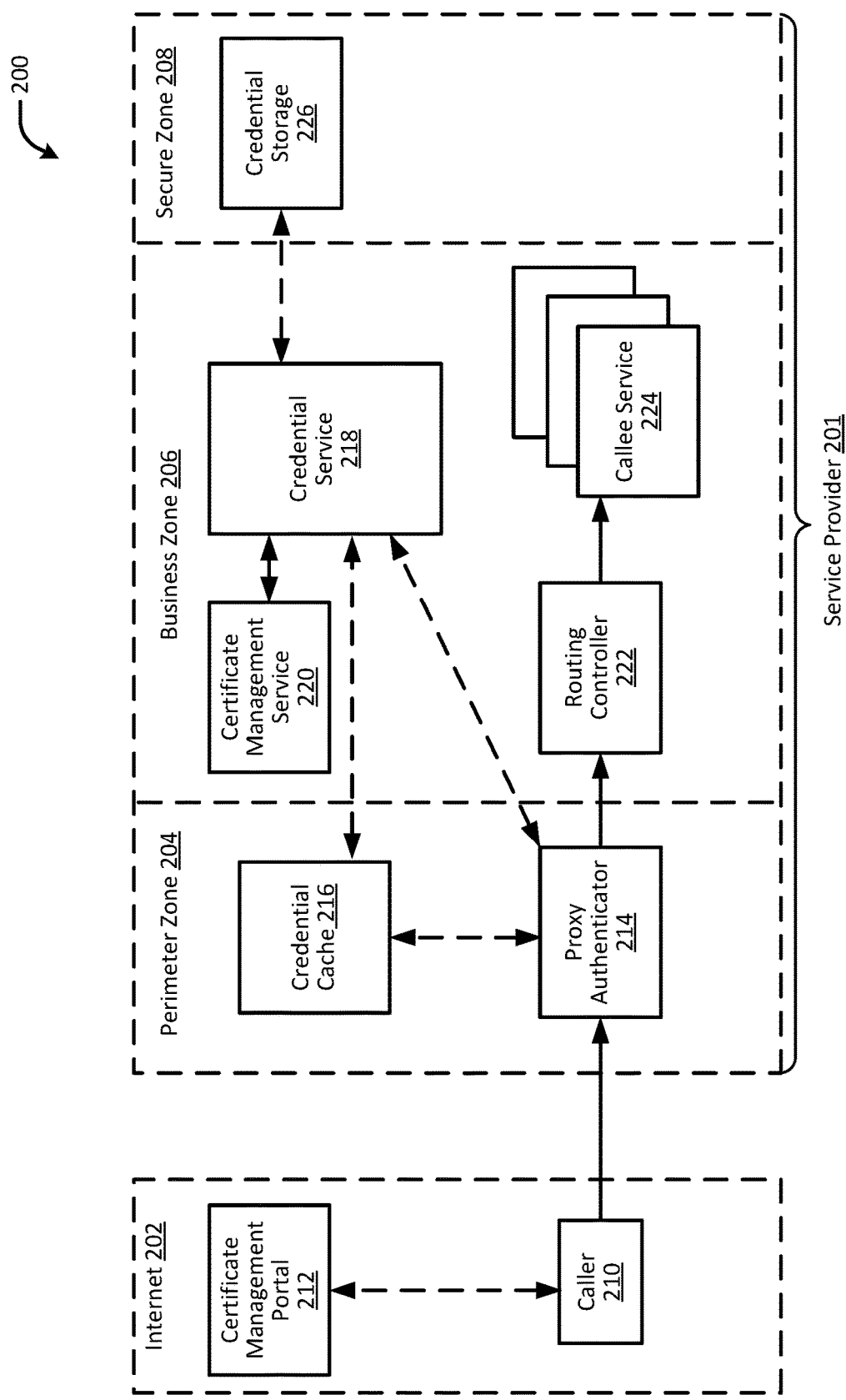
FIG. 2 illustrates another example system for implementing PKI-based message authentication, in accordance with embodiments.

FIG. 2 illustrates another example system 200 for implementing PKI-based message authentication, in accordance with embodiments. Specifically, FIG. 2 illustrates an example configuration of components of a service provider 201 that can be used to authenticate inbound messages from a caller 210. The inbound message can be used to call a service implemented by a callee service 224 of the service provider 201. In some embodiments, the service provider 201 can include a server system 104 and the caller 210 can include a client system 102 or a component thereof (e.g., the caller component 116), such as discussed in FIG. 1. Alternatively, the service provider 201 can include the server system 104 and the caller 210 can include a server system 104 or a component thereof (e.g., the caller component 124). The service provider 201 can include a certificate management portal 212, a certificate management service 220, a proxy authenticator 214, a credential cache 216, a credential service 218, a credential storage 226, a routing controller 222, and one or more callee services 224. Components of the service provider 201 can be located in different security zones such as the Internet, the perimeter zone 204, the business zone 206, and the secure zone 208, with increasing levels of security. In some embodiments, the business zone 206 and the secure zone 208 may be combined into one security zone. In other embodiments, the service provider 201 can include more than three security zones.

A. Proxy Authentication

The proxy authenticator 214 can be configured to validate inbound messages using PKI-based authentication techniques described herein (e.g., in FIGS. 5-8 and 10). The proxy authenticator 214 may include the server proxy 118 of FIG. 1, the client proxy 126 of FIG. 1, or the proxy authenticator 710 of FIG. 7. The proxy authenticator 214 is located in a low security zone (e.g., perimeter zone 204) of the service provider 201 so as to terminate traffic with malicious contents at the low security zone before the traffic reaches the higher security zones (e.g., the business zone 206 and secure zone 208).

In some embodiments, the proxy authenticator 214 is configured to authenticate an inbound message (e.g., API request message or API response message) that is signed using a cryptographic algorithm and a private key associated with the caller 210. The proxy authenticator 214 may be configured to retrieve a public key that corresponds with the private key used to sign the inbound message and use the public key and the cryptographic algorithm to authenticate the inbound message. The public key may be retrieved using a key ID that is provided as part of the client message 114. The proxy authenticator 214 may be configured to call the credential service 218 to retrieve the corresponding public key certificate using the key ID. Optionally, the proxy authenticator 214 can be configured to query the credential cache 216 that may be provided to improve the performance of data retrieval. Further discussion on authentication of message signatures is provided in FIGS. 5-6.

Additionally or alternatively, the proxy authenticator 214 can be configured to authenticate a signed authorization token that is included in an inbound message. The signed authorization token may have been previously issued by the service provider and signed using a cryptographic algorithm and a private key associated with the service provider (e.g., by an authentication or authorization controller, not shown, in the business zone 206 or secure zone 208). Further discussion on authentication of signed authorization tokens is provided in FIGS. 7-10. In some embodiments, the proxy authenticator 214 can be configured to query the credential cache 216 and/or the credential service 218 to retrieve the public key that corresponds with the service provider private key and to use the public key to authenticate the signed authorization token using the cryptographic algorithm that was used to sign the authorization token.

Once authenticated, the inbound message may be forwarded to a subsequent component that is located in the same or a different security zone for further processing. For example, as illustrated in FIG. 2, the proxy authenticator 214 can be configured to forward an authenticated message to a routing controller 222 (discussed below). In some other embodiments, the authenticated message may be forward directly to a callee service 224 that implements the service called by the inbound message.

B. Routing Control

The routing controller 222 can be configured to receive authenticated inbound API messages from the proxy authenticator 214 and route the authenticated inbound messages to the appropriate callee services 224 implementing the services requested by the inbound messages. In various embodiments, the routing decision may be based on the resource identifier (e.g., uniform resource identifier (URI)) specified in the API messages, caller characteristics (e.g., client IP address), load balancing considerations, and the like. In some implementations, the routing controller 222 can be configured to build service/security context for downstream systems to consume.

The authenticated inbound messages may include encrypted data. For instance, a portion of an API messages may be encrypted using a shared secret before being signed by the sender to further protect sensitive data in the API message. As another example, the API message may include an authorization token that is encrypted using a shared secret. In such cases, the routing controller 222 can be configured to decrypt some or all such encrypted data using the suitable shared secret. In some embodiments, the routing controller 222 may be configured to obtain, from the credential service 218 and/or a secure storage, the shared secret(s) necessary to decrypt the encrypted message data.

The routing controller 222 can be configured to perform further validation of the authenticated API message before routing the API message to the callee services 224. Such validation may be performed without decryption of the message data in the inbound message. For example, the routing controller 222 may be configured to check the origin (e.g., IP address) of the inbound messages to ensure that the messages originate from legitimate sources.

Alternatively, such validation may be performed after decryption of the message data. For example, information identifying the sender of the inbound message may be encrypted in the message to protect the identity of the sender during transit. Such identifying information can be decrypted by the routing controller 222 in order to validate the identity of the sender. In another example, the message can include API parameters or input data to a service. Some or all of such input data may be encrypted in the message by the sender. The routing controller 222 may be configured to decrypt some or all of such input data in order to validate the input data. In another example, the messages may include encrypted authorization tokens. The routing controller 222 can decrypt such encrypted authorization tokens in order to validate them. As discussed above, such authorization tokens may be initially authenticated by the proxy authenticator 214 to verify a token signature using a public key associated with the issuer of the authorization token (e.g., the service provider). The authenticated authorization token, if encrypted, may then be decrypted and further verified by the routing controller 222.

Typically, the routing controller 222 is located in a security zone (e.g., the business zone 206) that is more trusted than the security zone (e.g., the perimeter zone 204) in which the proxy authenticator 214 is located. Thus, the routing controller 222 can be allowed to access more sensitive data (e.g., shared secrets for decryption of message data and/or authorization tokens) and/or to perform more sensitive operations (e.g., decryption) relative to the proxy authenticator 214, which may not have access to such sensitive data. Accordingly, the separation of the proxy authenticator 214 and the routing controller 222 in different security zones allows termination of the PKI-based authentication at a less trusted security zone (e.g., perimeter zone 204) without exposing sensitive data in the less trusted security zone while protecting the security of the more trusted security zones (e.g., business zone 206 and/or secure zone 208).

C. Certificate Management

The certificate management portal 212 can implement a front end portal for the certificate management service 220 that allows a caller 210 to upload a public key certificate, download a public key certificate associated with the service provider, check a status (e.g., expiration) of a public key certificate, or otherwise manage public key certificates. The public key certificates managed by the certificate management service 220 can be structured according to any suitable standard (e.g., X.509) and in any suitable format (e.g., Privacy-enhanced Electronic Mail (PEM) format). The certificate management portal 212 can be located in an untrusted network such as the Internet 202. The certificate management service 220 can be configured to implement back end functionalities such as verification of certificates and the like. The certificate management service 220 can be located in the business zone 206 that is protected by the perimeter zone 204.

1. Certificate Upload

The certificate management portal 212 can be configured to allow a client (e.g., caller 210) to upload a public key certificate associated with the client in a user interface. The public key included in the uploaded public key certificate can correspond to a private key that is used by the client to sign messages directed to the service provider 201.

The certificate management portal 212 may be configured to provide the uploaded certificate to the certificate management service 220. The certificate management portal 212 and/or the certificate management service 220 may be optionally configured to perform certain verifications of the uploaded certificate. For example, the certificate management portal 212 and/or the certificate management portal 212 can be configured to perform root verification of the uploaded certificate by verifying the certificate is signed by one of a few acceptable certificate authorities (CAs) (e.g., by verifying a signature included in the certificated). Only certificates signed by these acceptable certificate authorities (CAs) are accepted. Additionally or alternatively, the certificate management portal 212 and/or the certification management service 212 may also validate the cryptographic parameters in the certificate or the public key (e.g., elliptic curve parameters used in a ECC based cryptographic algorithm). The certificate management portal 212 and/or the certificate management service 220 may also check the key expiration time and/or validate from time included in the certificate to ensure compliance with key management policies of the service provider 201. For instance, such key management policies may specify a particular time window within which the keys must be valid.

After validation of the uploaded certificate, the certificate management portal 212 can be configured to display, in a user interface, the subject, expiration, and/or other details of the uploaded certificate. The client can be prompted to confirm the upload of the certificate (e.g., by selecting a "Confirm" button in the user interface). Such client confirmation can serve as an assertion for mutual agreement about subject indicated by the uploaded certificate. After the confirmation, the certificate management portal 212 and/or the certificate management service 220 can associate the certificate with certain metadata describing the certificate such as a key owner identifier, a key type (e.g., RSA public key certificate (RSA_CERT), ECC public key certificate (ECC_CERT)), a key usage type (e.g., inbound authentication), a key subject, a key expiration or duration, and the like. A public key object comprising the public key or public key certificate and the metadata associated with the public key or public key certificate can then be stored for the client at the service provider 201 (e.g., by the credential service 218 and/or the credential storage 226).

Upon successful storage of the key object, a key ID that identifies the public key object (and hence the certificate or the public key contained therein) can be determined by the service provider 201. For instance, such a key ID may be generated by the credential service 218, discussed below. The certificate management portal 212 can be configured to display the key ID to the client that uploaded the certificate in a user interface. Alternatively, the key ID may be provided to the client via any other suitable communication means such as via email, text message, phone call, fax message, and the like. The client is expected to pass the key ID (e.g., as a URI query parameter) when making API calls to the service provider.

2. Certificate Download

The certificate management portal 212 can be configured to allow a caller 210 to download a public key certificate associated with the service provider. The public key included in the downloaded public key certificate can correspond to a private key that is used by the service provider 201 to sign messages directed to the caller 210.

The certificate management portal 212 can be configured to display, in a user interface, the subject, expiration, and/or other details of the downloaded certificate. The client can be prompted to confirm the download of the certificate (e.g., by selecting a "Confirm" button in the user interface). Such client confirmation can serve as an assertion for mutual agreement about subject indicated by the downloaded certificate. After the confirmation, the certificate management portal 212 and/or the certificate management service 220 can associate the certificate with certain metadata describing the certificate such as a key owner identifier, a key type (e.g., RSA public key certificate (RSA_CERT), ECC public key certificate (ECC_CERT)), a key usage type (e.g., outbound authentication), a key subject, a key expiration or duration, and the like. A public key object comprising the public key or the public key certificate and the metadata associated with the public key or public key certificate can then be stored for the client at the service provider 201 (e.g., by the credential service 218 and/or the credential storage 226). The certificate management portal 212 and/or the certificate management service 220 can also be configured to create a private key object for the private key corresponding to public key certificate. The private key object can include the private key as well as metadata describing the private key similar to those for the public key object such as key owner identifier, certain key type (e.g., private key (PRIVATE_KEY)), key usage type (e.g., outbound authentication), key subject, key expiration, and the like. The private key object can also be stored at the service provider 201 (e.g., by the credential service 218 and/or the credential storage 226).

A key ID that identifies the public key object (and hence the certificate or the public key contained therein) can determined by the service provider 201. The certificate management portal 212 can be configured to display the key ID in a user interface. Alternatively, the key ID may be provided to the client via any other suitable communication means such as via email, text message, phone call, fax message, and the like. In some embodiments, the key ID can also be used by the service provider 201 to identify the corresponding private key. The client is expected to verify signatures of outbound messages (from the service provider's point of view) using the appropriate public key identified by the key ID contained in such outbound messages and by following proper cryptographic algorithms as specified in the corresponding public key certificate (e.g., RSA or ECC).

3. Other Certificate Operations

The certificate management portal 212 and/or the certificate management service 218 can be configured to enable a user to query information for a public key or public key certificate. For instance, a user may enter a key ID and receive detailed information about the certificate identified by the key ID by using a user interface provided by the certificate management portal 212 or by invoking a query service provided by the certificate management service 218.

The certificate management portal 212 and/or the certificate management service 218 can be configured to enable a user to renew a previously uploaded certificate. The user may renew the certificate because it has expired or will expire soon. For instance, a user may provide a key ID associated with the previously uploaded certificate and upload a new certificate that is to replace the previously uploaded certificate by using a user interface provided by the certificate management portal 212 or by invoking an update service provided by the certificate management service 218, The certificate management portal 212 and/or the certificate management service 218 can be configured to enable a user delete a previously uploaded certificate. A user may provide a key ID associated with the previously uploaded certificate to be removed by using a user interface provided by the certificate management portal 212 or by invoking a deletion service provided by the certificate management service 218.

The certificate management portal 212 and/or the certificate management service 218 can be configured to notify a user about keys that have expired or are near expiration. For instance, a batch process may be configured to check the expiration of keys (e.g., by checking the "keyExpiration" fields of key objects). For keys that have expired or are near expiration, subjects of such keys can be determined (e.g., by extracting the "keySubject" fields of the key objects). An alert can be sent to alert administrative users to renew or update the expired or near-expiration certificates for those subjects.

D. Credential Service

The credential service 218 may provide an API that can be invoked by external clients or internal components of the service provider to support storage, retrieval, update, deletion, query, and other functionalities related to credentials. The credentials can include private/public keys and corresponding certificates used to authenticate messages, shared secret keys used to encrypt/decrypt payload data, user credentials such as username and/or passwords, biometrics credentials, and the like. The credential service 218 may be operably connected to a credential storage 226, which can include any suitable database or data store. In some embodiments, the credential storage 226 can be located in a highly secure zone 208 that is more trusted than a security zone of the credential service 218. In some other embodiments, the credential storage 226 can be located in the same security zone as the credential service 218.

1. Credential Storage/Update

The credential service 218 can be invoked by the certificate management service 220 or some other entity to store or update a public key certificate that a client has uploaded and to provide a corresponding key ID or any other type of credentials. An example API request to the credential service to store a certificate is provided below:

```
PUT /apikeys
Content-type: application/json
{
  keyOwnerId: "key-owner-id",
  keyUsage: "INBOUND_AUTHENTICATION",
  authenticationVersion: "xv3",
  keyType: "RSA_CERT",
  keySubject: "subject string of the cert",
  keyExpiration: "expiration of the cert",
  key: "x509-PEM string"
}
```

In the above example, "PUT" indicates an update data operation, "/apikeys" indicates a location to store the certificate, and the JSON object enclosed in the parentheses represents a key object to be stored at the specified location. The key object includes one or more name-value pairs corresponding to one or more fields within the key object. The "key" field includes the actual public key certificate (e.g., an X.509 certificate in PEM format). The remaining fields in the key object can include metadata describing the key. For example, the "keyOwnderId" field indicates an identifier of an owner of the key. The "keyUsage" field indicates a specific usage for the corresponding key. The keyUsage for a key that is used for inbound authentication (e.g., a client's public key) can be INBOUND_AUTHENTICATION. The keyUsage for a key that is used for outbound authentication (e.g., a server provider's private or public key) can be OUTBOUND_AUTHENTICATION. The keyUsage for a key that is used for payload encryption (e.g., shared secret key) can be ENCRYPTION. The "authenticationVersion" field indicates a version of the authentication scheme used (e.g., "xv3") for the corresponding key. The "keyType" field indicates a type for the corresponding key, which could be one of SHARED_KEY (for a shared secret key), PRIVATE_KEY (for a private key that is not shared), RSA_CERT (for a RSA certificate), or ECC_CERT (for an ECC certificate). The "keySubject" field identifies a subject of the certificate. The "keyExpiration" field indicates when the certificate expires. It is understood that JSON object provides an exemplary data structure that may be used to implement a key object for illustration only and is not intended to be limiting. For example, the data object can be implemented using XML (Extensible Markup Language) or any other suitable languages. More or less fields than illustrated may be included in a key object. The values for the various fields (e.g., keyType) can include additional and/or different values other than those discussed herein.

In response to the above API request to store a credential (e.g., certificate), the credential service may be configured to provide a response the corresponds to the API request. If the credential is successfully stored, a key ID associated with the stored credential may be returned with the response. If the credential is not stored (e.g., due to hardware failure), the response may indicate an error.

2. Credential Retrieval

The credential service 218 can also be invoked to retrieve credentials. For example, the certificate management service 220 can invoke the credential service 218 to retrieve a public key certificate of the service provider to be downloaded by a client. As another example, the credential service 218 can be invoked by the proxy authenticator 220 to retrieve a public key using a key ID so as to authenticate an inbound message. An example API request to the credential service to store certificates is provided below:

```
GET
/apikeys/{keyID}
    [[?keyUsage=INBOUND_AUTHENTICATION]
    [&keyType=RSA_CERT]
    [&authenticationVersion=xv3]]
```

In the above example, "GET" indicates a read data operation and "/apikeys/{keyID}" indicates a location from which to retrieve the data, where {keyID} is the value of the key ID associated with the certificate to be retrieved. In some embodiments, the certificates are stored and indexed by the key IDs in the credential storage 226. In some embodiments, credentials such as keys are uniquely identified by keyIDs associated with the certificates. For instance, the above request can be used to retrieve a key associated with the key ID. An error message (e.g. "404 Not Found") may be provided in the response if query parameter supplied do not match the stored record.

Optionally, additional query parameters can be specified in the request to allow the credential service to enforce domain restrictions on the usage of the credentials. Such usage restrictions can ensure that certain keys are restricted only for certain usage. For example, encryption keys are used restricted to encryption/decryption only, and not for signature signing or authentication purposes. Using query parameters to enforce usage restrictions allows the credential service to provide centralized consistency check of key usage, so that the clients for the credential service do not need to do so. For instance, the above request can include additional query parameters "keyUsage", "keyType", and "authenticationVersion." The values of the query parameters ("INBOUND_AUTHENTICATION", "RSA_CERT" and "xv3", respectively) are checked against the corresponding fields of the key associated with the keyID. The credential service can be configured to return a different error message (e.g., "400 Bad Request) if the query parameters supplied are not consistent with the fields of the retrieved credential (e.g., keyUsage for the key is Encryption and the authenticationVersion for the key is xv2). In some embodiments, if query parameters are missing, credential service is configured to return the key(s) merely based on matching keyID and the caller bears the responsibility for enforcing key-usages consistency.

3. Credential Status Check

The credential service 218 can also be invoked to query a status of a credential that is stored in the credential storage 226. In some examples, an external client or an internal component (e.g., a process that checks the status of certificates and/or provides notifications to clients) may invoke the credential service 218 to check status of credentials.

In some embodiments, two flavors of the query API may be provided. The first flavor of the API takes as input a key ID and outputs the status associated with the key ID. An example API request using this flavor is provided below:

GET/apikeys/{keyID}/status

A second flavor of the API takes as input the actual certificate or public key (e.g., as a PEM string) and return the status associated with the public key. An example API request using this flavor of API is provided below:

POST/apikeys/status
Content-type: application/x-www-form-urlencoded
X509CertPEM=url-encoded-PEM-string ID The credential service 218 may be configured to return an expiration status of the credential such as VALID, INVALID, or PENDING_EXPIRE. A VALID status may indicate that the credential is valid and not near expiration. An INVALID status may indicate that the credential has already expired. A PENDING_EXPIRE status may indicate that the credential has not expired but is close to expiration. For instance, PENDING_EXPIRE may be returned when the credential is within four weeks of expiration. The threshold for determining whether to a credential is close to expiration (e.g., with a status of PENDING_EXPIRE) may be determined based on a threshold amount of time before the expiration time of the credential. The threshold amount of time may be determined based on business rules or policies of the service provider. The threshold may vary for different types (e.g., key usage) of credentials. For example, signing keys may be associated with a shorter threshold than encryption keys, or vice versa. An error message may be returned by the credential service 218 if the status cannot be returned for some reason.

To enhance security, credential service 218 may impose a limit on the rate at which the API can be called to prevent any distributed denial of service (DDOS) attack or abuse of the system. For example, such rate limit may specify a maximum number of times the API can be invoked within a predefined period of time (e.g., three times per day). In some embodiments, the rate limit may be specifically associated with a key ID or a group of key IDs.

E. Credential Cache

In some embodiments, a credential cache 204 may be optionally provided to improve the performance of the retrieval of credentials such as public keys and/or public key certificates used for authentication API messages. The credential cache may be located in the same zone (e.g., perimeter zone 204) as the proxy authenticator 214. When retrieving a public key or public key certificate, the proxy authenticator 214 may be configured to query the credential cache 216 first. If there is a hit in the credential cache 216, then the cached copy of the public key or certificate may be used by the proxy authenticator 214. If there is a miss (e.g., a valid copy does not exist in the cache), then the proxy authenticator 214 may be configured to query the credential service 218. The retrieved public key or certificate may be stored in the credential cache 216 to speed up subsequent retrieval of the same public key or certificate. A time-to-live (TTL) (e.g., one hour) may be assigned to the cache entries to limit the risk of stale entries being used. After the expiration of the TTL, a cache entry is invalid and can only be refreshed with a fresh query to the credential service 218. In some embodiments, the credential service 218 may be configured to push frequently-used public keys and/or certificates to the credential cache 204. In some other embodiments, the proxy authenticator 214 or some other entity may be configured to obtain the frequently-used public keys and/or certificate from the credential service 218 and put them into the credential cache 204.

II. PKI-Based Message Authentication Methods

A. Signing Methods

Embodiments of the present invention allow a sender of a message to sign API messages using PKI-based methods. The sender can sign the API messages at application-level instead of at a lower level (e.g., network or protocol level) to facilitate cryptographic identification of authentication principals at the application level. Additionally, the signing of the API messages can occur at a trusted network (e.g., internal network) that is protected from external traffic.

Figure 3:
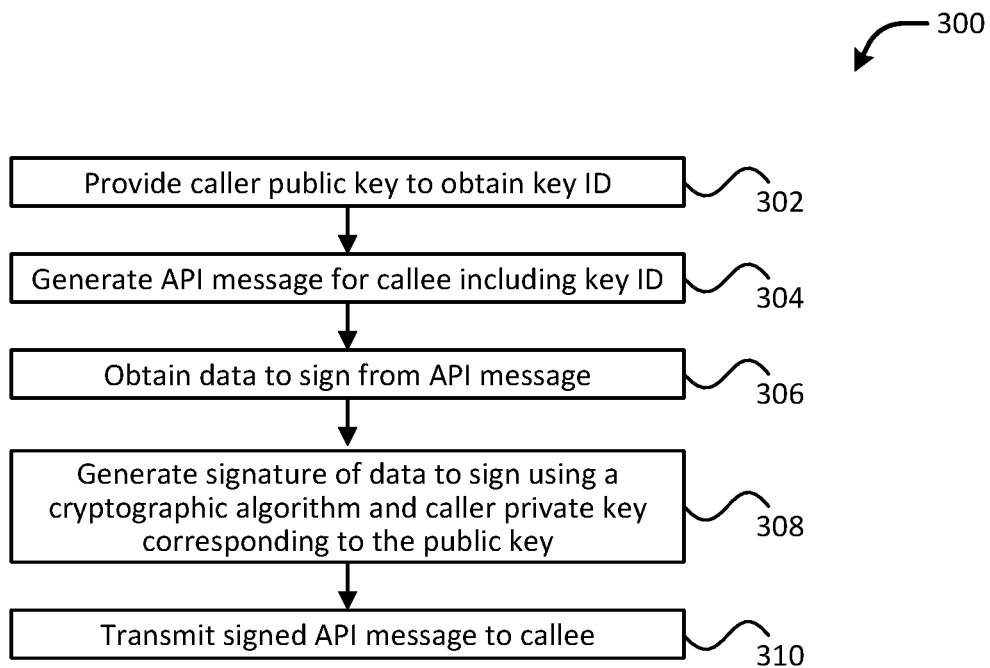
FIG. 3 illustrates an example process for signing a message, in accordance with embodiments.

FIG. 3 illustrates an example process 300 for signing a message, in accordance with embodiments. The process 300 can be used by a caller (client) to sign a message to be transmitted to callee (service provider), for example, to invoke a service provided by the callee. The caller can include a process or an application running in a relatively high security zone of a system. For instance, aspects of the process 300 can be implemented by the client caller 116 or the server caller 124 of FIG. 1 or the caller 210 of FIG. 2. Some or all aspects of the process 300 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 302, a caller public key is provided to a callee, which can send back to the caller a key ID associated with the public key. The caller public key can be part of a private/public key pair for the caller. The key pair can be generated by the caller. Alternatively, the key pair may be generated by another entity for the caller. The key pair can be generated specifically for message signing. In various embodiments, the caller public key or a public key certificate containing the caller public key may be uploaded to a callee (e.g., a service provider) via a portal (e.g., web service, web-based user interface) provided by the callee, transmitted to the callee in a message, or uploaded or transmitted to a third-party entity that manages the public key for the callee.

A key identifier (key ID) that identifies the public key (or the public key certificate) can be obtained by the caller. The key ID may be issued by the callee or a third-party entity that manages the caller public key. The key ID can be of any suitable format including a random number, an alphanumeric string, a global unique identifier (GUID), and the like. In some embodiments, the key ID can be used to uniquely identify the specific public key. In other embodiments, the key ID can be used to uniquely identify a key (e.g., public key) for the caller.

At block 304, an API message is generated using the key ID. The message can include an API request for a service provided by the caller or an API response provided corresponding to a previous API request. For example, the message can include a method to be invoked and a resource identifier associated with the service API (e.g., a URI for the service) with or without parameters. The message can also include a header portion that includes metadata, and a body portion that includes payload data. The key ID may be included in any suitable portion of the message. For instance, the key ID can be embedded in the URI as a parameter. In another example, the key ID can be included as a header field in the message header.

At block 306, the data to sign is obtained from the API message. The data to sign can include some or all of the message header and some or all of the message body. To improve performance, the data to sign does not include the entire message. In some embodiments, message header can includes header fields specific to the callee. Some or all of such callee-specific header fields can be included in the data to sign. In some embodiments, the message header and/or the message body can be hashed or otherwise encoded before being included in the data to sign in order to reduce the size of the data to sign. Any suitable hashing algorithm can be used such as MD5. For instance, a header hash can be generated from the message header using MD5. A body hash can be generated from the message body using MD5.

In some embodiments, the data to sign can also include a timestamp indicating when the message is made. For instance, the timestamp can be a request timestamp indicating when an API request is made or a response timestamp indicating when an API response is made. The timestamp may be used by the receiver of the message (e.g., callee) to validate the message. For example, the time at which the message is received by the callee can be compared with the timestamp included in the message. If a predetermined threshold amount of time has lapsed since the time indicated by the timestamp, the message may be rejected as invalid.

In some embodiments, the data to sign can also include the resource identifier (e.g., URI) of the service API to be invoked by the message. Thus, the data to sign, and hence the signature generated thereafter, would be tied to not only the specific message header, message body, and request timestamp, but also to the particular service API.

Optionally, the message can be encrypted using an encryption key that is separate from the private/public key pair used for signing the message. For instance, the message body can be encrypted using the encryption key and the encrypted message body can then be used to generate the data to sign as described above. The encryption key may be generated based on a shared secret between the caller and the callee. Alternatively, the encryption key can be a private key of another private/public key pair used for encryption purposes.

At block 308, a signature of the data to sign is generated using a cryptographic algorithm and a private key corresponding to the public key. The cryptographic algorithm can include a cryptographic hash function (e.g., SHA-2 or SHA2), an encryption function (e.g., RSA, ECC), or a combination thereof (e.g., RSA-SHA2, elliptic curve digital signature algorithm (ECDSA)). Preferably, the cryptographic algorithm is based on the public key infrastructure (PKI). The private key can be the caller private key that was generated as part of the private/public key pair above. The data to sign and the private key can be used as input into the cryptographic algorithm to generate a signature. For instance, a hash for the data to sign may be generated using a cryptographic hash function (e.g., SHA-2) of the cryptographic algorithm (e.g., RSA-SHA2) and the hash may encrypted using the private key using a PKI-based encryption function (e.g., RSA) of the cryptographic algorithm (e.g., RSA-SHA2) to generate the signature. Since this step involves private key operation, it is preferably performed by a process in a relative high security zone of a system to reduce the risk of key exposure. It is understood that cryptographic algorithms based on RSA (e.g., RSA signature algorithm such as RSA-SHA2) and ECC (e.g., ECDSA) are discussed herein for illustrative purposes only and not intended to be limiting. Any other suitable cryptographic algorithms can be used in various embodiments. For instance, other algorithms can include Digital Signature Algorithm (DSA), ElGamal signature scheme, Niederreiter cryptosystem, and the like.

A signature token can be generated based on the signature. The signature token can include the signature. Optionally, the signature token may include other information such as a timestamp, a version identifier for the token, and the like. Such other information may be combined (e.g., concatenated) with the signature to generate the signature token.

The signature token can be added to the initial message to form the signed message. The signature token can be included in any suitable portion of the message. For instance, the signature token can included as a header field in the header portion of the message or inserted into the body of the message. In some other embodiments, the signature token may be appended at the end of the message or prepended to the beginning of the message. In various embodiments, the signed message includes information about the algorithm(s) used to transform or encode the message so as to help a receiver of the message to decode or authenticate the message. For example, the message can include information about the cryptographic algorithm used to generate the signature, the hash function used to generate the hashes of the message header and message body, and encryption algorithm used to encrypt the message, the order in which data objects are arranged, and the like. Such information may be included, for example, in the header fields of the message.

At block 310, the signed API message is transmitted to the callee. For instance, the message may be transmitted as an HTTP message (e.g., HTTP request or HTTP response) using REST protocols.

Figure 4:
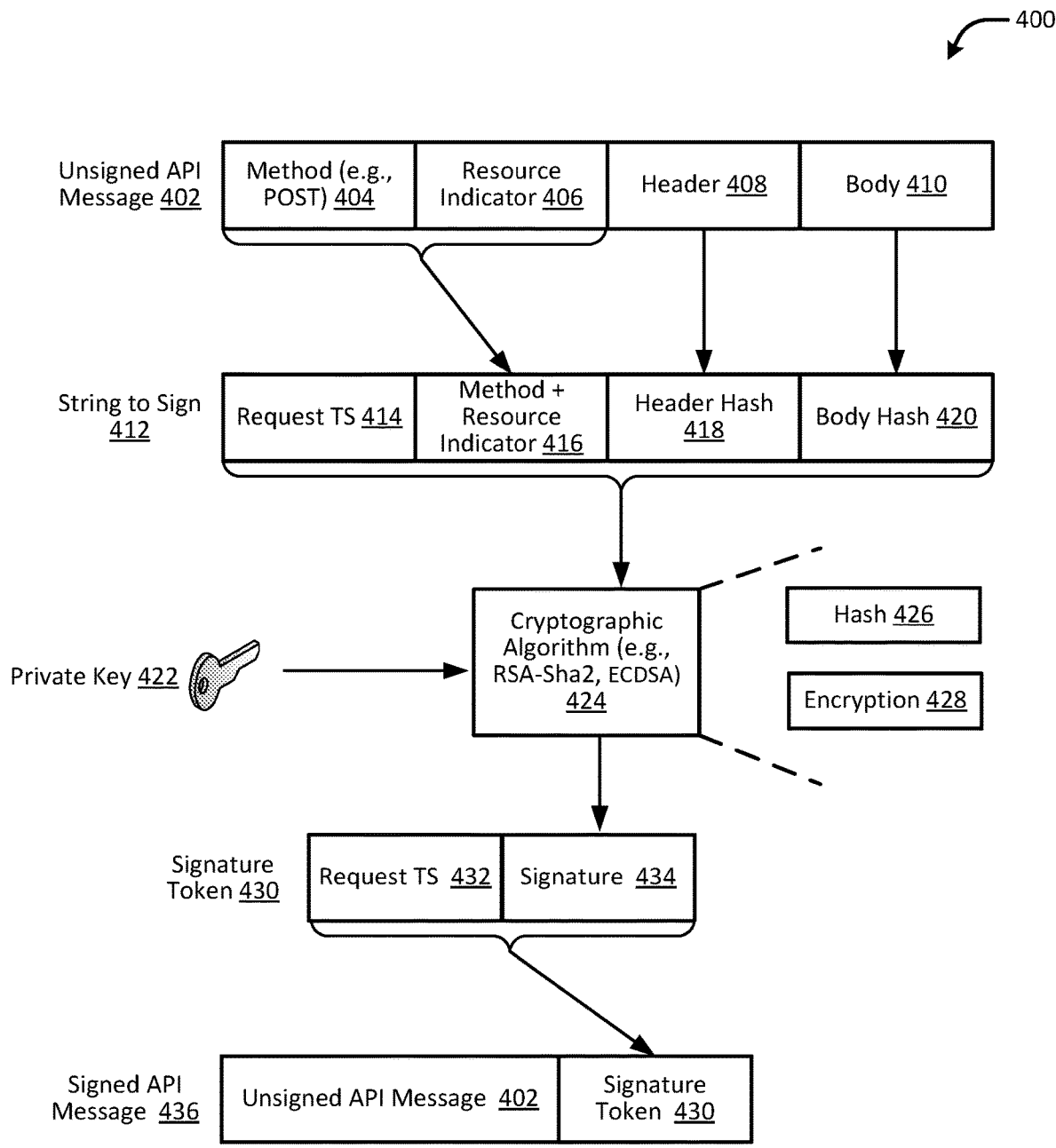
FIG. 4 illustrates an example process for signing an API request, in accordance with embodiments.

FIG. 4 illustrates, in further detail, an example process 400 for signing an API message, in accordance with embodiments. The process 400 can be used by a caller to sign a message to be transmitted to a callee, for example, to request a service provided by the callee or to provide a response to a previously received request. The caller can include a process or an application running in a relatively high security zone of a system. For instance, aspects of the process 300 can be implemented by the client caller 116 or the server caller 124 of FIG. 1 or the caller 210 of FIG. 2.

As illustrated, an unsigned API request 402 can include a method 404, a resource identifier 406, a message header 408, and a message body 410. The method 404 can include HTTP methods such as GET, POST, PUT, HEAD, DELETE, and the like. The resource identifier 406 (e.g., an URI) can be used to identify a service to be invoked by the API message. For example, an example resource indicator is provided below:

"/serviceprovider/
    apiname?parameter1=abc&parameter2=efg"

In some embodiments, a key ID that identifies the public key used for authenticating the API message can be embedded as a parameter as part of the resource indicator. For example, the above resource indicator can be modified to include the key ID "123":

"/serviceprovider/
    apiname?parameter1=abc&parameter2=efg&keyID=
    123"

The message header 408 can include one or more header fields, each with a field name and a corresponding field value. Some of the header fields may be custom fields specific to the service provider that provides the service. For example, such custom header fields can include an "x-serviceprovider-device-id" header field that indicates an identifier of a device that generates the API message and an "x-serviceprovider-request-id" header field that indicates an identifier for the current request.

A string to sign 412 (also referred to as data to sign) can be generated based at least in part on the unsigned API message 402. For example, the string to sign 412 can include a timestamp 414 (e.g., 1430178344). The timestamp may be in any suitable format such according to POSIX.1 UTC time standard. The timestamp can indicate a time when the API message is generated or sent.

The string to sign 412 can also include a combination (e.g., concatenation) of the method 404 and the resource identifier 406, such as "POST/serviceprovider/apiname?parameter1=abc&parameter2=efg"&keyID=123". In some embodiments, only the resource indicator or a portion thereof is included in the string to sign without the method.

The string to sign 412 can also include a header hash 418, which is a hash of some or all header fields in the header 408 of the API message. Such header fields used to generate the header hash 418 may include some or all of the custom header fields specific to the service provider. In some examples, the header fields can be ordered by lexical ascending or descending order based on header field names before being provided to a hash function. Any suitable hash function can be used including cryptographic hash functions such as MD2, MD4, MD5, MD6, SHA-1, SHA-2, SHA-3, SHA-256, SHA-516, BLAKE-256, BLAKE-512, and the like and non-cryptographic hash functions. For instance, the header hash 418 can be a 128-bit MD5 hash generated according to the RFC 1864. In some embodiments, the header hash 418 can be included as a header field in the header 418 (e.g., a "x-serviceprovider-header-md5" header field). This header field is preferably not used as an input for generating the header hash 418. The header hash 418 may be included in the API message for debugging or validation purposes. In some other embodiments, the header hash 418 is not included as a header field in the API message.

The string to sign 412 can also include a body hash 420 (also referred to as content hash), which is a hash of some or all data in the message body 410 of the API message. Any suitable hash function can be used for generating the body hash. The hash function for generating the body hash 420 may or may not be the same as the hash function for generating the header hash 418. For instance, the body hash 420 can be a 128-bit MD5 hash generated according to the RFC 1864. In some embodiments, the body hash 420 may be included as a header field (e.g., "content-md5" header field) in the API message. The body hash 420 may be included in the request for debugging or validation purposes. In some other embodiments, the body hash 420 may not be included in the API message.

The message timestamp 414, a combination of method and resource indicator 416, header hash 418, and body hash 420 can be combined to form the string to sign 412. In an embodiment, the four components are concatenated and separated by a separator (e.g., "."). An example string to sign can be
"1430178344.Q2hlY2sgSW50ZWdyaXR5IQ==.X3ijZ5rhWQ79YKembTS4OA==.POST/serviceprovider/servicename?parameter1=abc&parameter2=efg"&keyID=123",
where "1430178344" is the request timestamp, "Q2hlY2sgSW50ZWdyaXR5IQ==" is the body hash, "X3ijZ5rhWQ79YKembTS4OA==" is the header hash, and "POST/serviceprovider/servicename?parameter1=abc&parameter2=efg"&keyID=123" is the method/URI combination. In some embodiments, the above four components of the string to sign may be otherwise processed before being combined into the string to sign. In other embodiments, the string to sign can include more, less, or different components than discussed herein. The order in which the components are combined may be any suitable order.

The string to sign 412 and a private key 422 of a private/private key pair can be used as input into a PKI-based cryptographic algorithm 424 to generate a signature 434 (also referred to as a digest). The cryptographic algorithm 424 can include a digital signature algorithm such as RSA-SHA2, ECDSA, or the like. The digital signature algorithm can include a key generation algorithm, a signing algorithm, and a signature verification algorithm. The key generate algorithm may be used to generate the private/public key pair. The signing algorithm can be configured to generate a signature given a message and the private key of the key pair. And the signature verification algorithm can be configured to accept or reject the message's claim to authenticity given the message, the signature, and the public key corresponding to the private key. Here, the private key 422 and the string to sign 412 are provided as input into the signing algorithm of the digital signature algorithm 424. In some embodiments, the signing algorithm can include a hash function 426 (e.g., a cryptographic hash function) and an encryption function 428. The hash function 426 may be used to generate a hash of the string to sign 412. The hash of the string to sign and the private key 422 may then be provided to the encryption function to output an encrypted hash of the string to sign as the signature 434 of the string to sign 412.

A signature token 430 can be generated based on the signature 434. The signature token can include the signature 434 and optionally some additional information such as a timestamp 432 (which may be the same as the timestamp 414), a token version number (e.g., "xv3", not shown), and the like. For instance, the token version number, the timestamp 432, and the signature 434 can be combined (e.g., concatenated) in any suitable order to form the signature token 430.

The signature token 430 may be combined with the unsigned API message 402 to form a signed API message 436. Preferably, the signature token 430 can be included in a header field (e.g., "x-pay-token" header field) of the signed API message 436. Alternatively, the signature token 430 may be included the message body of the signed API message 436.

The way the signature token is constructed can improve security of the API messages by ensuring that the same signature token cannot be reused for different APIs, for the same API but with a different payload, or for the same API or the same payload but with a different timestamp. The client may, however, be allowed to reuse the same signature token for the same API with the same payload and the same timestamp. The inclusion of the timestamp in the signature token can limit any potential malicious attack to a predetermined time-window, as discussed below.

B. Verification Methods

Embodiments of the present invention allow a receiver to verify a message that has been signed using the PKI-based methods (e.g., as discussed in FIGS. 3-4) to ensure the message's integrity and authenticity. Such verification can be performed by a proxy authenticator located in a low security zone (e.g., perimeter zone or DMZ) of a system using only a public key corresponding to the private key used to sign the message, thereby reducing the risk of exposure of sensitive information.

Figure 5:
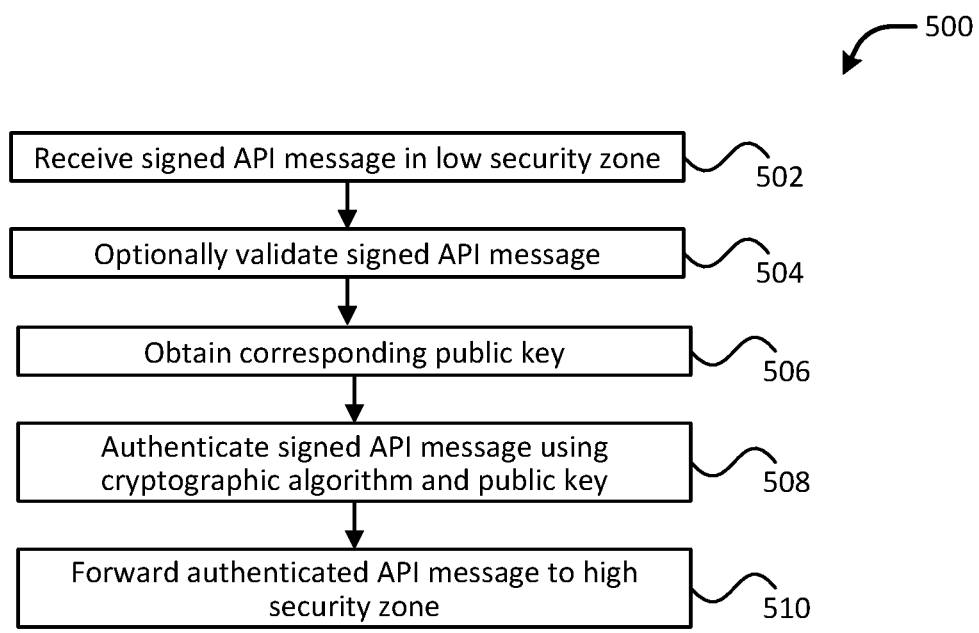
FIG. 5 illustrates an example process for verifying a message, in accordance with embodiments.

FIG. 5 illustrates an example process 500 for verifying a message, in accordance with embodiments. The process 500 can be implemented by a proxy authenticator located at a relatively low security zone of the receiving system to verify the authenticity and integrity of the message before passing on the authenticated message to components in higher security zones for further processing. For instance, aspects of the process 500 can be implemented by a server proxy 118, a client proxy 126 of FIG. 1, a proxy authenticator 214 of FIG. 2, or a proxy authenticator 701 of FIG. 7.

At block 502, a signed API message is received by a proxy authenticator located in a relatively low security zone or a less trusted network (e.g., perimeter zone) of a system. The message may have been signed using methods such as discussed in FIGS. 3-4. For example, the message may have been signed using a private key of a private/public key pair and a PKI-based cryptographic algorithm (e.g., digital signature algorithm). In particular, the message may have been signed using a signing algorithm of the digital signature algorithm.

At block 504, the signed API message may be optionally validated before verifying the signature of the signed message. In some embodiments, a timestamp associated with the message may be compared with a current time to determine whether the time that has lapsed since the timestamp exceeds a predetermined threshold amount of time (e.g., eight minutes). If so, the message may be determined to be invalid. The timestamp may indicate a time when the message was created or sent or when some other predetermine event occurred. The timestamp may be obtained from the signed message. For example, the timestamp may be extracted from a signature token that is included in the header of the signed message.

Additionally or alternatively, a network address of the sender of the message (e.g., an IP address) may be verified against a predetermined whitelist or blacklist containing, respectively, allowable or prohibited network addresses. The whitelist or blacklist can include a range of network addresses. In some embodiments, the whitelist and/or blacklist can be specified by a sender of the message. In other embodiments, the whitelist and/or blacklist can be generated by the receiver of the message or a third-party intrusion detection system. In some cases, the whitelist or blacklist may be selected based on information included in the message. For example, the predetermined whitelist or blacklist may be selected based on a key ID included in message. The key ID may be included in a resource indicator (e.g., URI) or a header field of the message.

Additionally or alternatively, if a hash of the message header or message body is provided (e.g., as part of the message header), then a hash of the corresponding header or body is calculated and compared with the provided hash to ensure integrity of the message. The hash function to use may be indicated by the message itself. In an embodiment, if the header field "content-md5" exists, then an MD5 hash of the content or body of the message may be calculated and compared with the value of the "content-md5" header field. If the calculated value does not match the header field, then an error message such as the following may be returned to the sender of the message:

```
HTTP/1.1 400 Bad Request
Content-Type: application/json;charset=UTF-8
{
  "error":"invalid_request",
  "error_description":"The content-md5 does not match"
}
```

In an embodiment, if the header field "x-serviceprovider-header-md5" exists, then an MD5 hash of the header of the message (excluding the "x-serviceprovider-header-md5" field) may be calculated and compared with the value of the "x-serviceprovider-header-md5" header field. If the calculated value does not match the header field, then an error message such as the following may be returned to the sender of the message:

```
HTTP/1.1 400 Bad Request
Content-Type: application/json;charset=UTF-8
{
  "error":"invalid_header",
  "error_description":"The header-md5 does not match"
}
```

At block 506, a public key is obtained that corresponds to the private key that is used sign the message. In some embodiments, a key ID can be extracted from the message (e.g., from the URI or message header). The key ID can be used (e.g., by a credential service 218 of FIG. 2) to retrieve the corresponding public key or certificate that contains the public key. In some embodiments, a credential cache (e.g., credential cache 216 of FIG. 2) may be queried first to improve performance.

At block 508, the signed message may be authenticated using the public key and the cryptographic algorithm (e.g., RSA-SHA2 or ECDSA) that was used to sign the message. Information about the cryptographic algorithm to use may be indicated by the message itself (e.g., in a header field). To authenticate the signed message, a signature token can be extracted from the signed message. A digital signature can be extracted from the signature token. Some or all data included from the signed message can be used to construct the verification data to sign. The verification data to sign, the digital signature, and the public key can be used input into the cryptographic algorithm to determine whether the authenticity and integrity of the message.

In some embodiments, the cryptographic algorithm can include a signature verification algorithm that corresponds to the signing algorithm that was used to sign the message. For instance, the cryptographic algorithm can include a hash function and a decryption function. The hash function can be the same hash function that was used in the signing algorithm. The decryption function can correspond to the encryption function that was used in the signing algorithm. The digital signature can be decrypted using the decryption function and the public key to generate decrypted data. Some or all data included from the server message can be used to construct the verification data to sign. The verification data to sign can be hashed using the hash function to generate a verification hash. The verification hash may be compared with the decrypted data. If there is a match, then the authenticity as well as the integrity of the message can be ensured. If there is not a match, an error message may be returned to the sender of the message.

At block 510, the authenticated API message is forwarded to a higher security zone for further processing. For instance, the authenticated message can be forwarded to a routing controller located in a higher security zone (e.g., routing controller 222 of FIG. 2). The routing controller can be configured to route the message to a server implementing a service requested by the message and/or perform additional validation or processing of the message such as discussed in section I.B. In some embodiments, the authenticated message can be forward directly to the component that fulfill the API message such as a server implementing a service or resource requested by an API request.

Figure 6:
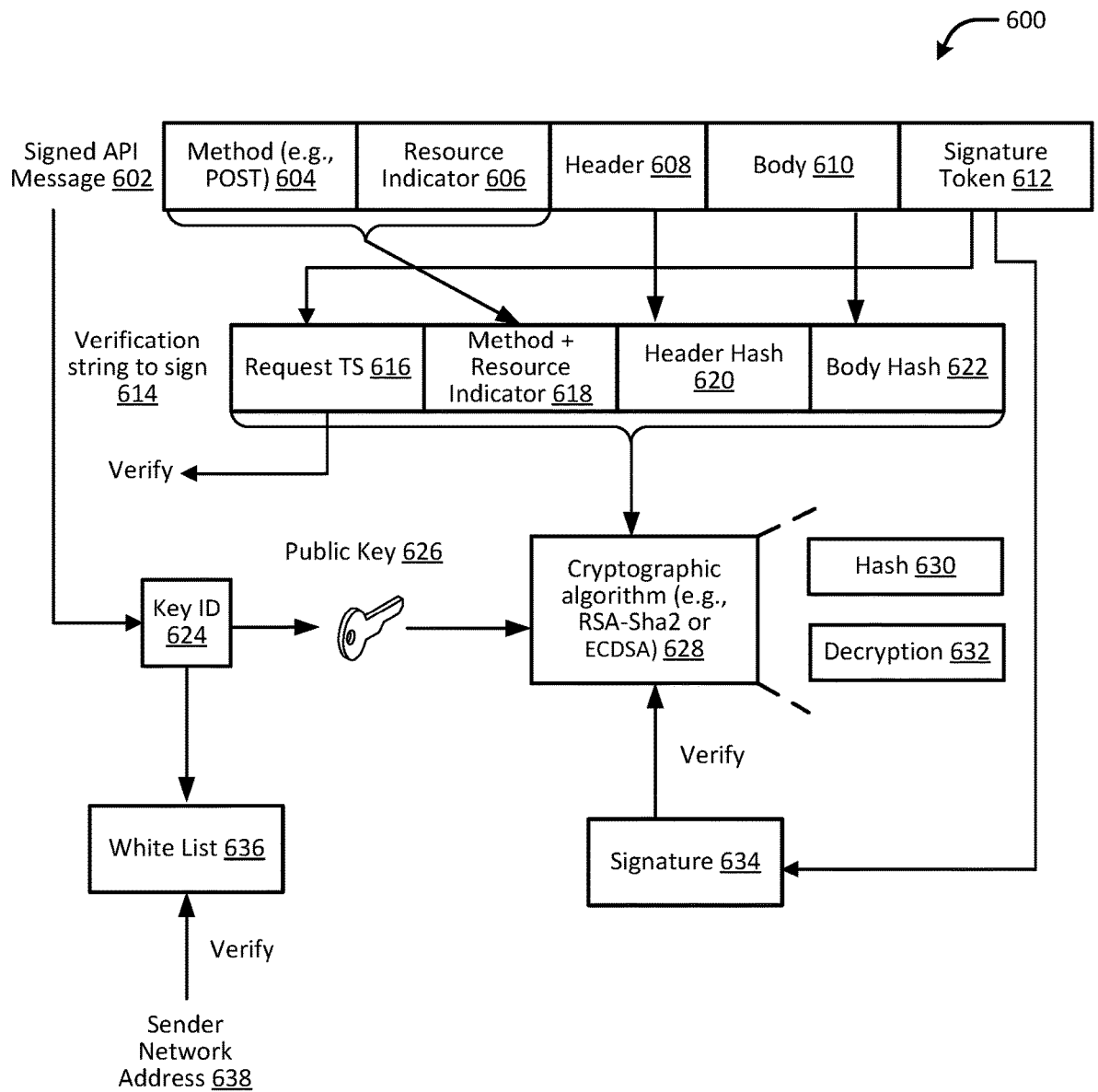
FIG. 6 illustrates an example process for authenticating a signed API request, in accordance with embodiments.

FIG. 6 illustrates in further detail, an example process 600 for authenticating a signed API message, in accordance with embodiments. The process 600 can be implemented by a proxy authenticator located at a relatively low security zone of the receiving system to verify the authenticity and integrity of the message before passing on the authenticated message to components in higher security zones for further processing. For instance, aspects of the process 500 can be implemented by the server proxy 118 or client proxy 126 of FIG. 1 or a proxy authenticator 214 of FIG. 2, or a proxy authenticator 710 of FIG. 7.

As illustrated, a signed API message 602 can be received. The signed API message 602 can include a method 604, a resource identifier 606, a message header 608, a message body 610, and a signature token 612. The signature token 612 may be included in the message header 608.

The signature token 612 can be extracted from the signed API message 602. A timestamp 616 (e.g., a request timestamp or a response timestamp) and a signature 634 can be extracted from the signature token 612. The request timestamp 616 can be used to construct a verification string to sign 614. The verification string to sign 614 can also include a combination string 618 of the method 604 and the resource indicator 606, a header hash 620 comprising a hash of the header 608, a body hash 622 comprising a hash of the body 610. A hash function (e.g., MD5) for generating the header hash 620 or the body hash 620 may be indicated by the signed message. The timestamp 616 can be verified against a predetermined threshold amount of time such as discussed in block 504 of FIG. 5.

A key ID 624 can be extracted from the signed API message 602. The key ID may be included as part of the resource indicator 606 or the header 608. The key ID 624 may be used to obtain a public key 626 that corresponds to the private key used to generate the signature 634. In some embodiments, the key ID 624 can also be used to retrieve a whitelist 636 of allowable network addresses. The whitelist 636 can be compared with the sender's network address 638. In some cases, the sender's network address 638 may be determined from the signed API message 602. If the sender's network address 638 falls within the whitelisted network addresses or range of network addresses, then the request may be considered valid. Otherwise, the request may be determined to be invalid and blocked.

The public key 626, the verification string to sign, and the signature 634 can be provided as input into the cryptographic algorithm 628 (e.g., digital signature algorithm) that corresponds with the one used by the sender to sign the request. For instance, the cryptographic algorithm can include a signature verification algorithm that corresponds with the signing algorithm used by the sender. In some embodiments, the cryptographic algorithm 628 includes a hash function 630 and a decryption function 632. The hash function 630 may be applied to the verification string to sign to generate a verification hash. The decryption function may be applied to the signature 634 and the public key 626 to generate decrypted data. The decrypted data and the verification hash may be compared to determine if there is a match. If so, the integrity and authenticity of the message is verified. If there is a mismatch, then the verification fails.

III. PKI-Based Token Authentication

Embodiments of the present invention also provide PKI-based authentication of authorization tokens. Such authentication techniques may be suitable for authenticating clients that are not capable of implementing the message signing techniques discussed earlier. In some cases, the clients may not be capable of securely storing sensitive cryptographic keys (e.g., private key) required for signing client messages. For instance, such clients may not be equipped with any software or hardware based security module (e.g., hardware security module (HSM), smart card, chip card). Alternatively or additionally, the clients may not be sufficiently protected from external traffic by firewalls or perimeter networks. In some other cases, the clients may not be equipped with the computing capabilities (e.g., CPU, memory) to implement cryptographic algorithms required for digital signing. Examples of such clients can include web-based applications (e.g., browsers), mobile applications not supported by security modules, and the like.

In order to authenticate API messages coming from such a client, a service provider may be configured to first issue a signed authorization token to the client upon successful authentication of the client. The authorization token may be signed by an authorization controller in a high security zone of the service provider using a private key of a private/public key pair generated by the service provider. Subsequently, the client may include such a signed authorization token in an API message that is sent to the service provider. The service provider may authenticate, by a proxy authenticator at a low security zone (e.g., perimeter zone) of the service provider, the signed authorization token using the corresponding public key. The authenticated API message may then be forwarded to a higher security zone for further processing. Thus, the authentication of the API messages terminates at a low security zone of the service provider without the exposure of private keys in the low security zone, thereby providing better protection to data and logic inside in the higher security zones.

A. Systems

Figure 7:
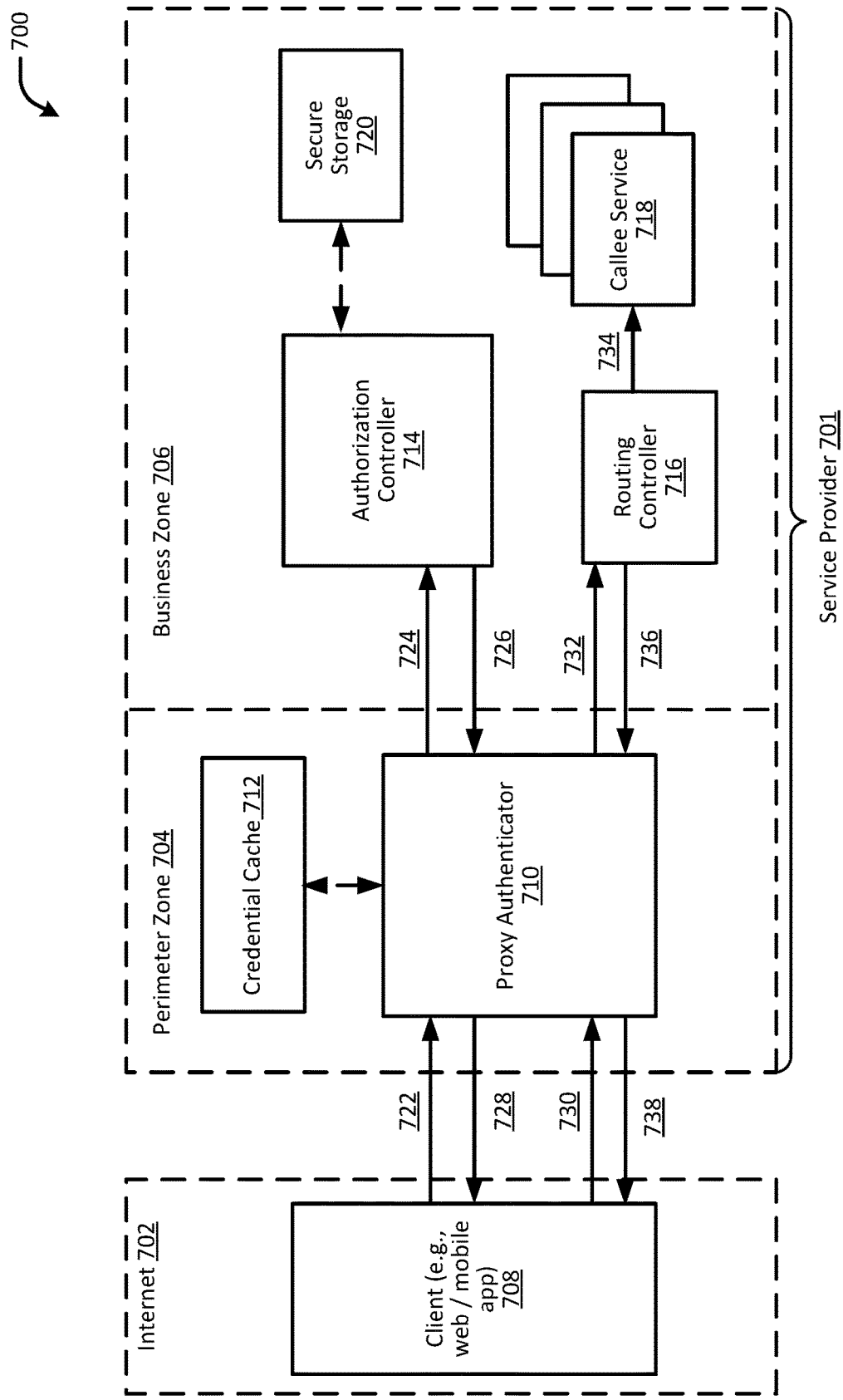
FIG. 7 illustrates an example system for implementing PKI-based token authentication, in accordance with embodiments.

FIG. 7 illustrates an example system 700 for implementing PKI-based token authentication, in accordance with embodiments. A client 708 located in an untrusted environment such as the internet 702 can be configured to communicate with a service provider 201 in order to utilize services provided by the service provider 701. The client 708 may include a web-based application (e.g., browser) or a mobile application running on a mobile device (e.g., mobile phone, tablet, laptop, etc.). The service provider 701 may be similar to the service provider 201 of FIG. 2 and/or be implemented by a server system 104 of FIG. 1.

The server system of the service provider 201 may comprise two or more physical or logical network zones, each associated with a different level of network security. For instance, as illustrated in FIG. 7, the server system comprises a perimeter zone 704 with a lower level of security or trustworthiness and a business zone 706 with a higher level of security 706. The perimeter zone 704 may be the first network of the service provider network that interfaces traffic coming from the external network (e.g., the Internet 702). The business zone 706, on the other hand, is further insulated from the external network via the perimeter zone 704 and/or one or more firewalls between the business zone 706 and the external network and/or between the business zone 706 and the perimeter zone 704.

The service provider 701 can comprise components that are located in different security zones. For instance, as illustrated in FIG. 7, the service provider comprises a proxy authenticator 710 and a credential cache 712 located in the perimeter zone 704. The service provider also comprises an authorization controller 714, routing controller 718, secure storage 720, and one or more callee services 718 located in the business zone 706. The components may be implemented, collectively or individually, by one or more computing devices such as servers, mobile devices, and the like. In some embodiments, two different components in the same or two different security zones may be implemented by two different computing devices. Alternatively, two different components in the same or two different security zones may be implemented by a single computing device. For example, the component in a higher security zone may be implemented using a secure hardware element of the computing device and/or protected by application-specific or process-specific firewall implemented in software running on the computing device; whereas the component in a lower security zone may be implemented using a less secure hardware element of the computing device and/or not protected by the software firewalls of the computing device.

The client 708 can be configured to receive client credentials from a user. The client credentials may include username and password or other credentials for the client application. Alternatively, a client may be configured to obtain delegated access to resources of the service provider on behalf a resource owner (e.g., a user), similar to the mechanisms of Oauth or OpenID. In the delegated access scenario, the client may be configured to allow the user to authenticate directly with an authentication service of the service provider 701 using the user's credentials with the service provider (e.g., by redirecting from a login page of the client to a login page of the service provider).

The client 708 can be configured to transmit an authorization request 722 to the service provider 701. The authorization request 722 can include user credentials that a user provides (e.g., either for direct access or for delegated access). For example, an example authorization request 722 can include:

POST/serviceprovider/auth/token
Content-type: application/x-www-form-urlencoded
grant_type=password&username=name&password=pass The authorization request 722 may be intercepted by the proxy authenticator 710. Instead of tunneling the request through network devices directly, the proxy authenticator 710 may be configured to use an HTTP client to invoke a corresponding authorization controller 714 located in the business zone 706 via an authorization request 724. The authorization request 724 may include some or all of the information included in the authorization request 722. An example authorization request 724 can include:

POST/serviceprovider/auth/token
Content-type: application/ x-www-form-urlencoded
grant_type=password&username=name&password=pass The authorization controller 714 may be configured to authenticate the user credentials included in the authorization request 724. For example, the user credentials may be verified against the stored user credentials to determine if there is a match. Upon successful authentication of the user credentials, an authorization token (also referred to as an access token) may be generated. The authorization token may encapsulate the security identify of the user (e.g., device ID), security credentials for a login session, access rights and privileges, and the like. The authorization token can be used by the client, in subsequent requests, to gain access to resources of the service provider. In some embodiments, an authorization token comprises the following information:

(1) user tenancy (i.e., the identity of the party who owns the user);
(2) session ID (also referred as actor-ID);
(3) user ID (unique identifier for the user);
(4) authentication level (e.g., whether user logs in with a payment processing network password, with a issuing bank's password, and/or with biometrics feature such as fingerprints, voice/facial recognition; whether the user has passed any step-up authentication such as secure questions or one-time token; whether the user has to answer challenge questions in a static or dynamic one-time token delivered through pre-verified second channel (e.g., email or SMS));
(5) authorization scope (e.g., whether the session is allowed to invoke certain APIs. For example, payment checkout session normally is prohibited from invoking payment token provision APIs;
(6) device ID (e.g., an identifier of the device that initiated the session), so as to ensure, for security considerations, that the authorization token cannot be migrated to or used by different end-points on the client side);
(7) issuing time (e.g., the timestamp when authorization token is issued);
(8) expiration time (e.g., the number of seconds from issuing time by which the authorization token will be considered as expired);
(9) client ID (e.g., identifier of a client (e.g., an authorized partner, such as a bank or a wallet provider like Google) on whose behalf the particular authorization token is issued);
(10) a counter (e.g., an integer that indicates how many times the authorization token has been extended). By default authorization token expires in a predefined value (e.g., eight minutes). A client can invoke API to renew a near-expiring authorization token. Renewal of an authorization token may cause the counter to increment by a predetermined amount (e.g., one).

In some embodiments, the authorization controller 714 can be configured to encrypt the authorization token to protect the content therein. Any suitable encryption can be used to encrypt some or all portions of the authorization token. For example, the authorization token can be encrypted using a shared secret and a cryptographic algorithm such as AES-GCM.

The authorization controller 714 can be configured to generate or otherwise obtain a private/public key pair (e.g., RSA or ECC key pair) and use the private key of the private/public key pair to sign the authorization token (which may be encrypted) using a cryptographic algorithm (e.g., RSA-SHA2 ECDSA). The private key may be stored in a secure storage 720 whereas the public key may be provided to the credential cache 712 accessible by the proxy authenticator 710. In some cases, a cryptographic algorithm with a shorter key size (e.g., ECDSA) is preferred because the authorization token is typically required in almost every request for API service, and shorter key size (e.g., from an ECC based algorithm) can significantly reduce the overhead and reduce the chances of exceeding buffer sizes in network devices.

To sign the authorization token (which may be encrypted), a token to sign may be constructed by combining an expiration time and/or any other suitable information with the authorization token. A token signature may be generated for the token to sign using the private key and the cryptographic algorithm. For instance, the token to sign may be hashed using a hash function of the cryptographic algorithm (e.g., SHA-2) and the hash of the token to sign may be encrypted using an encryption function (e.g., ECC or RSA) of the cryptographic algorithm and the private key to generate the token signature. The signed authorization token may be a combination of the token to sign and the token signature. For instance, the token signature may be appended to the end of the token to sign or prepended to the front of the token to sign to form the signed authorization token.

In some embodiments, the shared secret used to encrypt the authorization token, the private key used to sign the encrypted authorization token, and other sensitive information used by the service provider components may be stored in a secure storage 720. In an example, the secure storage 720 can include a hardware security module (HSM), a data crypto service (DCS), or any other suitable secure data storage. The DCS can be configured to provide centralized cryptographic algorithms as REST APIs. In some implementations, the DCS can be built on HSM and/or JAVA crypto libraries.

The signed authorization token may be transmitted back to the proxy authenticator 710 in an authorization response 726. The authorization response 726 may include an API response (e.g., a REST API response). An example of the authorization response 726 is provided below:
 HTTP/11 200 OK
 Content-type: application/j son
 (access_token: "timestamp:access_token:[ECDSA (private-key) (timestamp:access_token)]", token_type: "Bear", expires_in "480")

In the above example, the "timestamp" can indicate a time the token is generated and the "expires_in" indicates when the time period from the timestamp that the token will expire. Alternatively, the "timestamp" can indicate an expiration timestamp without including the "expires_in" field. The token to sign is the "timestamp:access_token", which is the concatenation of the value of "timestamp", a separator ":", and the value of "access_token" (the authorization token which may be encrypted). The "[ECDSA (private-key) (timestamp+access_token)]" is the token signature which is the output of applying the cryptographic algorithm ECDSA to the private key and the token to sign.

The proxy authenticator 710 may be configured to forward the content included in the authorization response 726 back to the client 708 in an authorization response 728.

The client can include the signed authorization token in a subsequent service request 730 that is transmitted to the service provider. The service request may be used to invoke a service provided by the service provider. The service request may be an API message (e.g., API request). The service request An example of such a service request is provided below:
 POST/visa/aRestAP1
 Authorization: Bearer [timestamp]:[signed token]

Here, the "timestamp" indicate a time the request is made and "signed token" is the signed authorization token that has been received by the client from the service provider.

The proxy authenticator 710 can be configured to verify the timestamp of the service request 730 with the expiration time associated with the authorization token to determine validity of the authorization token. Furthermore, the proxy authenticator 710 can be configured to verify the token signature of the signed token using the cryptographic algorithm (e.g., RSA-SHA2 or ECDSA) and the public key that corresponds with the private key used to sign the authorization token. The proxy authenticator 710 may be configured to obtain the public key for the access token (or authorization token) for signing purpose. The public key may be a preconfigured key associated with a predetermined key ID. The authenticator uses can use the preconfigured key-ID to retrieve the preconfigured public key to verify the token signature. In some embodiments, the public key can be retrieved from a credential cache 712 in the perimeter zone 704 similar to the credential cache 216 of FIG. 2. If the public key is not found in the credential cache 712, the proxy authenticator 710 may be configured to obtain the public key from a credential service (not shown) in the business zone 706 similar to the credential service 218 of FIG. 2. In some embodiments, the proxy authenticator 710 can also be configured to perform some or all of the functionalities of the proxy authenticator 214 discussed in FIG. 2.

After successfully verifying the request 730, the proxy authenticator 710 can be configured to transmit the authenticated service request 732 to the routing controller 716 located in a higher security zone (e.g., business zone 706) for further processing. The authenticated service request 732 can include substantially the same information as the service request 730 received by the proxy authenticator. In some embodiments, the service request 732 may include the authorization token (which may be encrypted) without the token signature, since the token signature has already been verified. In some other embodiments, the token signature can be included in the service request 732 but not verified by the routing controller 716 since it has already been verified by the proxy authenticator.

In some embodiments, the routing controller 718 can be configured to decrypt the authorization token using the same algorithm (e.g., AES-GCM) and the same shared secret used to encrypt the authorization token, if the authorization token has been previously encrypted (e.g., by the authorization controller 714) before being signed. Information in the decrypted authorization token (e.g., security identify of the user (e.g., device ID), security credentials for a login session, access rights and privileges, etc.) may be verified. The routing controller 718 can also be configured to create a service context for the service request and route the service request to the proper callee service 224 implementing the requested service in a service request 734. In some embodiments, the routing controller 718 can also be configured to perform some or all of the functionalities of the routing controller 222 discussed in FIG. 2.

In some embodiments, the routing controller 718 can be configured to provide a service response 736 (e.g., an API response) to the proxy authenticator 710 that corresponds to the service request 732. In some embodiments, the service response 736 can reflect a response received from a callee service 718 that corresponds to the service request 734. The proxy authenticator 710 can be configured to forward the service response 736 back to the client 708 in a service response 738. An example of the service response 736 or 738 is provided:
 HTTP/11 200 OK
 (response data)

As illustrated, the authentication of the API messages (e.g., authentication of the signed authorization tokens) terminates at a low security zone of the service provider without the exposure of private keys in the low security zone, thereby providing better protection to data and logic inside in the higher security zones.

B. Methods

Figure 8:
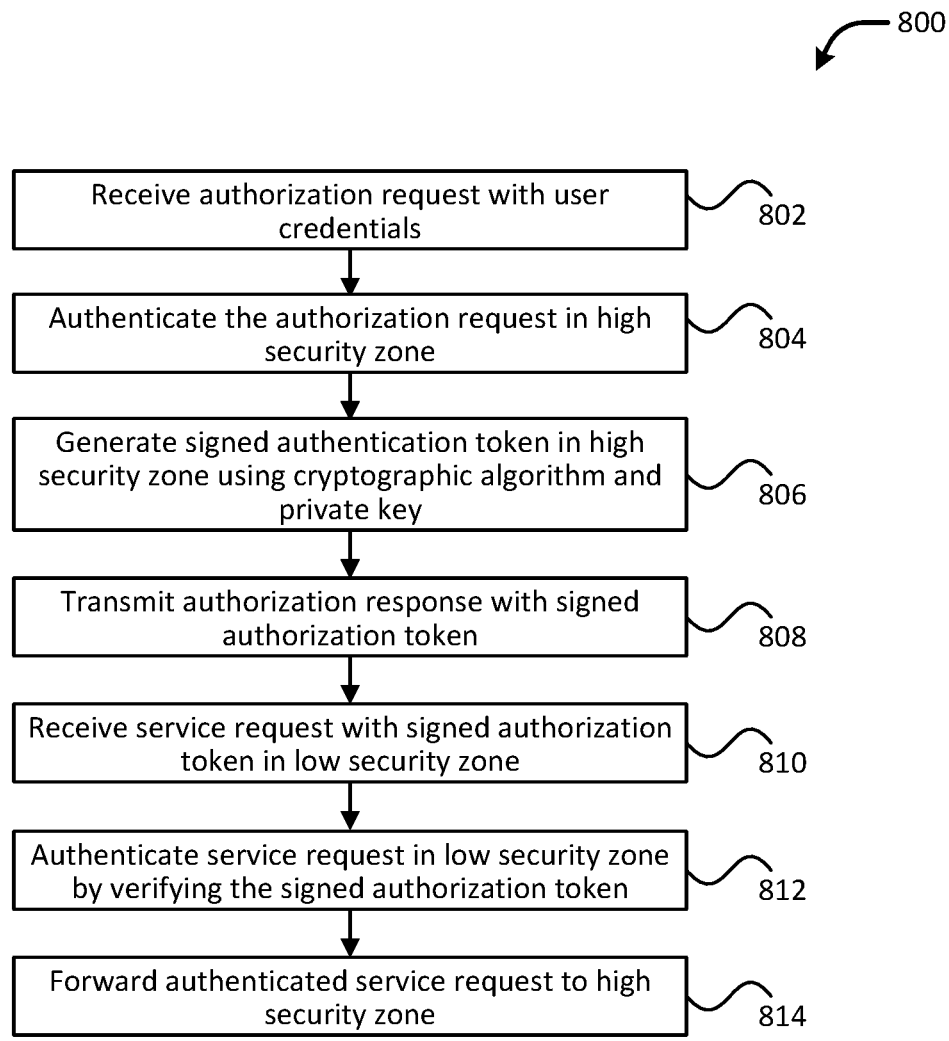
FIG. 8 illustrates an example process for implementing PKI-based token authentication, in accordance with embodiments.

FIG. 8 illustrates an example process 800 for implementing PKI-based token authentication, in accordance with embodiments. The process 800 can be implemented by components of service provider to authenticate client requests by authenticating provider-issued authorization tokens. Aspects of the process 800 can be implemented a proxy authenticator located at a relatively low security zone of the service provider (e.g., proxy authenticator the server proxy 118 of FIG. 1, proxy authenticator 214 of FIG. 2, or proxy authenticator 710 of FIG. 7) and/or an authorization controller in a relatively high security zone (e.g., authorization controller 714 of FIG. 7).

At block 802, an authorization request is receive comprising user credentials. The authorization request may be transmitted by a client such as the client 708 of FIG. 7. The authorization request may be received by a proxy authenticator located at a low security zone of a service provider, such as proxy authenticator the server proxy 118 of FIG. 1, proxy authenticator 214 of FIG. 2, or proxy authenticator 710 of FIG. 7. The authorization request may be an API message (e.g., a REST API request). The authorization request may include one or more user credentials received from a user operating the client such as username and password.

At block 804, the authorization request is authenticated in a high security zone of the service provider. In an embodiment, the authorization request is forwarded by a proxy authenticator located in a low security zone to an authorization controller located in the high security zone (e.g., in an API message). The authorization controller may then authenticate the authorization request. Authenticating the authorization request can include authenticating the user credentials (e.g., username and password) included in the authentication request.

At block 806, a signed authorization token is generated in the high security zone using a cryptographic algorithm and a private key. The authorization token can be generated by the authorization controller upon successful authentication of the authorization request. The authorization token may encapsulate the security identify of the user (e.g., device ID), security credentials for a login session, access rights and privileges, and the like. In some examples, the authorization token may be optionally encrypted using any suitable encryption algorithm. For example, the authorization token can be encrypted using a shared secret and a cryptographic algorithm such as AES-GCM.

The authorization token (which may be encrypted) can be digitally signed (e.g., by the authorization controller). To that end, a private/public key pair can be generated using a PKI-based key generation algorithm (e.g., a RSA or ECC based algorithm). The private key of the private/public key pair can be used to sign the encrypted authorization token (which may be encrypted) using a cryptographic algorithm (e.g., RSA-SHA2 ECDSA), whereas the public key of the private/public key can be made available to the proxy authenticator in the low security zone. Further details on token signing are provided in FIG. 9.

At block 808, an authorization response comprising the signed authorization token can be transmitted back to the client. In some embodiments, the authorization controller can be configured to provide the signed authorization token to the proxy authenticator in an API response (e.g., a REST API response). The proxy authenticator can then forward the authorization response to the client.

At block 810, a service request is received in a low security zone of the service provider, the service request comprising the signed authorization token. The service request may be sent by a client that received authorization request above. Alternatively, the service request may be sent by a different entity. The service request may include an API message (e.g., a REST API request) for a service provided by the service provider. The service request can be received by a proxy authenticator located in the low security zone.

At block 812, the service request can be authenticated in the low security zone by verifying the signed authorization token. For instance, the proxy authenticator in the low security zone can be configured to verify the signed authorization token included in the service request such as discussed in further detail in FIG. 10. An expiration time associated with the authorization token may be obtained based on the signed authorization token to determine if the token as expired. Additionally, the public key associated with the private key used to sign the authorization token can be obtained in conjunction with the cryptographic algorithm (e.g., RSA-SHA2 or ECDSA) used to sign the authorization token. The proxy authenticator may be configured to obtain the public key from a credential cache (e.g., credential cache 216 of FIG. 2) in the low security zone. If the public key is not found in the credential cache, the proxy authenticator may be configured to obtain the public key from a credential service (e.g., credential service 218 of FIG. 2) in a higher security zone. If authentication of the service request fails for some reason, the proxy authenticator may be configured to return an error message to the client.

At block 814, the authenticated service request is forwarded to a high security zone for further processing. The authenticated service request can be forward by the proxy authenticator to a routing controller located in a higher security zone, for example, via a an API message (e.g., a REST API request). The routing controller can be configured to decrypt the authorization token using the same algorithm (e.g., AES-GCM) and the same shared secret used to encrypt the authorization token, if the authorization token has been previously encrypted prior to being signed. Information in the decrypted authorization token (e.g., security identify of the user (e.g., device ID), security credentials for a login session, access rights and privileges, etc.) may be verified. The routing controller can also be configured to create a service context for the service request and route the service request to the proper component of the service provider (e.g., a server) implementing the service requested by the service request.

In some embodiments, the routing controller can be configured to provide a service response (e.g., an API response), to the proxy authenticator, a service response that corresponds to the service request (e.g., based on a response received from the service being called). The proxy authenticator can be configured to forward the service response back to the client in a service response (e.g., an API response).

Figure 9:
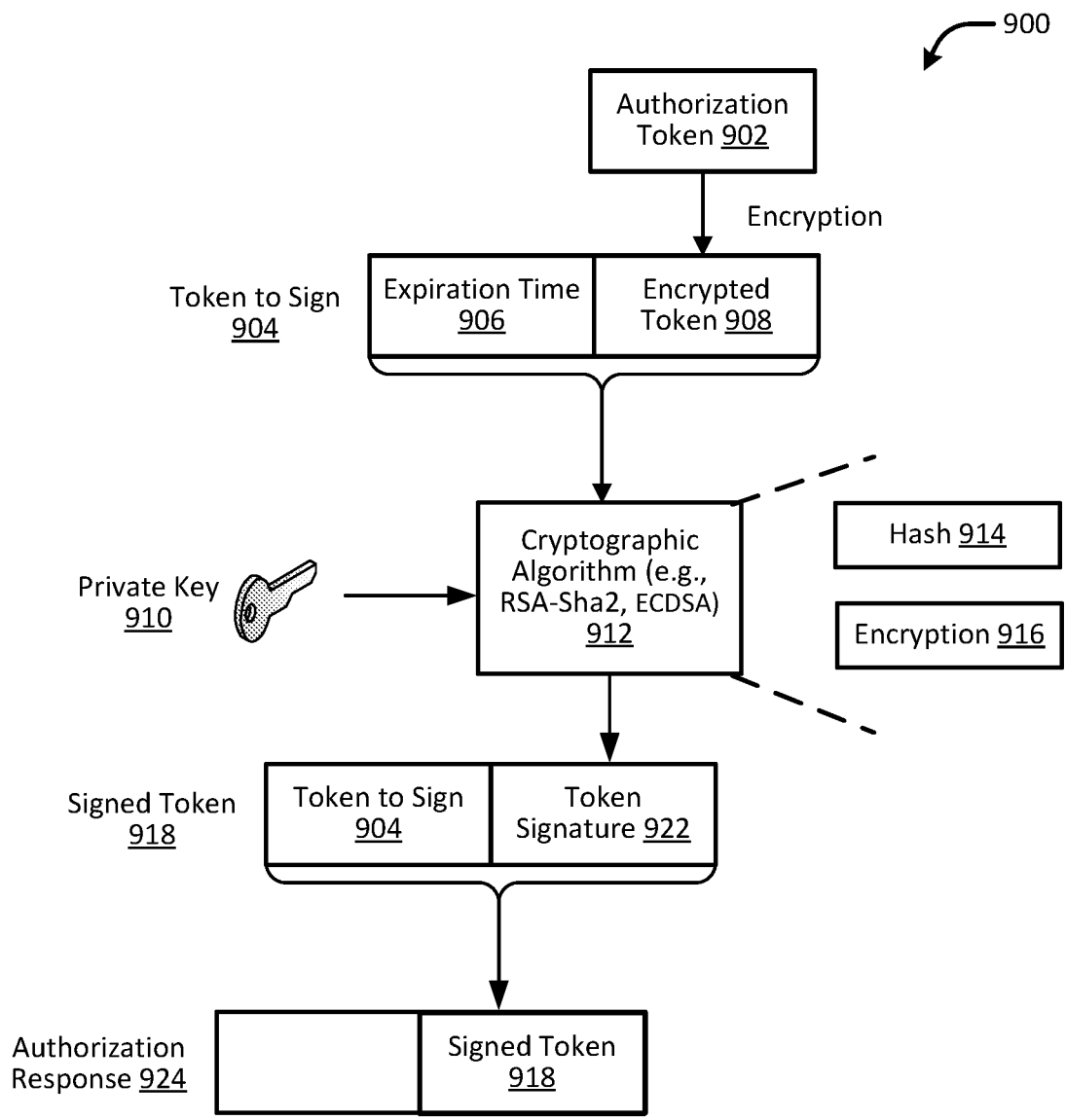
FIG. 9 illustrates an example process for generating a signed authorization token, in accordance with embodiments.

FIG. 9 illustrates an example process 900 for generating a signed authorization token, in accordance with embodiments. In some embodiments, the process 900 may be implemented by an authorization controller in a high security zone of a service provider (e.g., authorization controller 714 of FIG. 7).

As illustrated, an authorization token 902 may be generated upon successful authentication of user credentials provided in an authorization request. The authorization token may be encrypted to generate an encrypted token 908, using any suitable encryption algorithm (e.g., AES-GCM) and a shared secret. The encrypted token 908 may be combined with an expiration timestamp to generate a token to sign 904.

A private/public key pair (e.g., an RSA or ECC key pair) can be generated for signing the authorization tokens. The private key 910 of the private/public key pair can be used to sign the token to sign in conjunction with a PKI-based cryptographic algorithm 912 (e.g., RSA-SHA2 or ECDSA). The cryptographic algorithm 912 can include a hash function 914 and an encryption function 916. The hash function 914 can be used to generate a hash of the token to sign 904. The hash of the token to sign can be encrypted using the encryption function 916 and the private key 910 to generate a token signature 922. The token signature 922 can be combined with the token to sign 904 to generate the signed token 918. For instance, the token signature 922 may be appended to the end of the token to sign 904 or prepended to the front of the token to sign 904. The signed token 918 can be included in an authorization response 924 that corresponds to the authorization request that is used to request the authorization token. For instance, the signed token 918 can be included as payload data in the message body portion of the authorization response 904.

Figure 10:
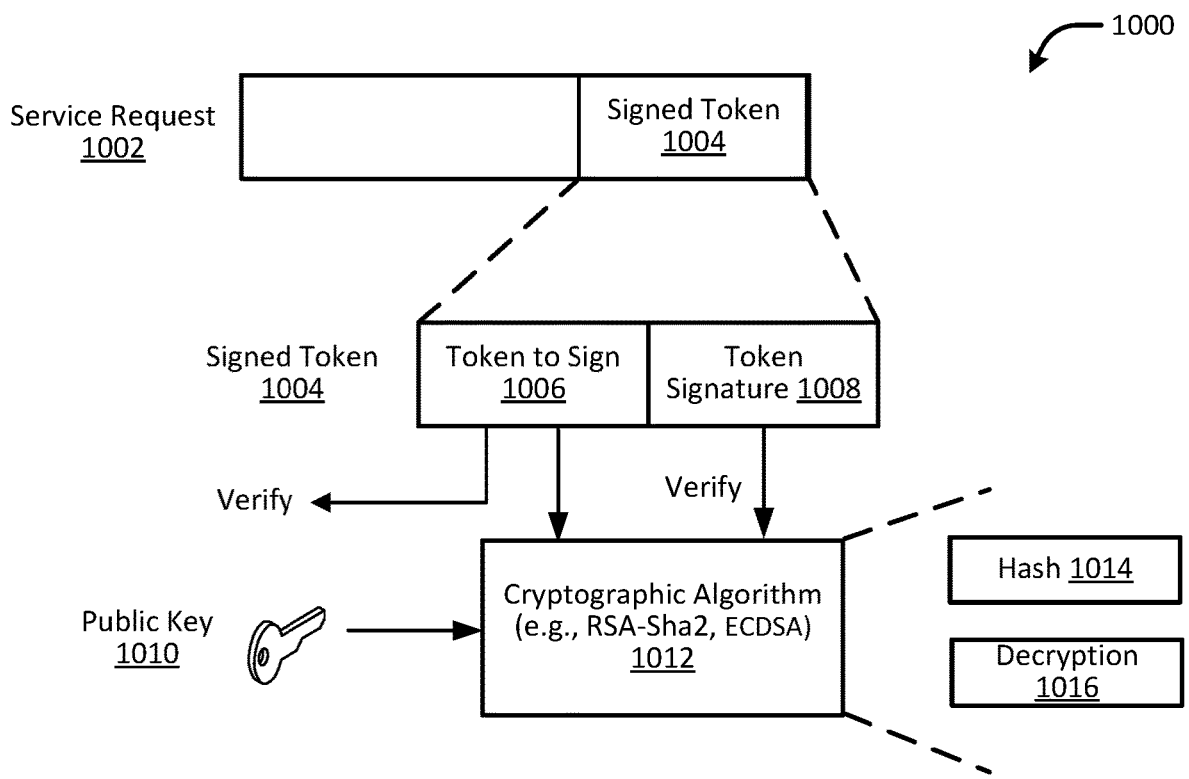
FIG. 10 illustrates an example process for verifying a signed authorization token, in accordance with embodiments.

FIG. 10 illustrates an example process 1000 for verifying a signed authorization token, in accordance with embodiments. In some embodiments, the process 1000 may be implemented by a proxy authenticator in a low security zone of a service provider (e.g., proxy authenticator 710 of FIG. 7) to verify a signed authorization token 1004 included in a service request 1002.

As illustrated, the signed authorization token 1004 can be extracted from the service request 1002. The signed authorization token can include a token to sign 1006 and a token signature 1008. The token to sign 1006 may include a timestamp that may be verified to ensure that the authorization token has not expired.

The public key 1010 that corresponds to the private key used to generate the token signature 1008 may be obtained. The public key 1010, the token to sign 1006 and the token signature 1008 can be provided as input into the PKI-based cryptographic algorithm 1012 (e.g., RSA-SHA2 or ECDSA) used to generate the token signature so as to verify the authenticity and integrity of the signed token 1004. In some embodiments, the cryptographic algorithm 1012 can include a hash function 1014 and a decryption function 1016. The hash function 1014 can be used to generate a hash of the token to sign 1016. The token signature 1008 can be decrypted using the decryption function 1016 and the public key 1010 to generate decrypted data. The decrypted data can be compared with the hash of the token to sign to determine if there is match. If there is a match, then the authenticity and integrity of authorization token is verified.

IV. Computer Apparatus

Figure 11:
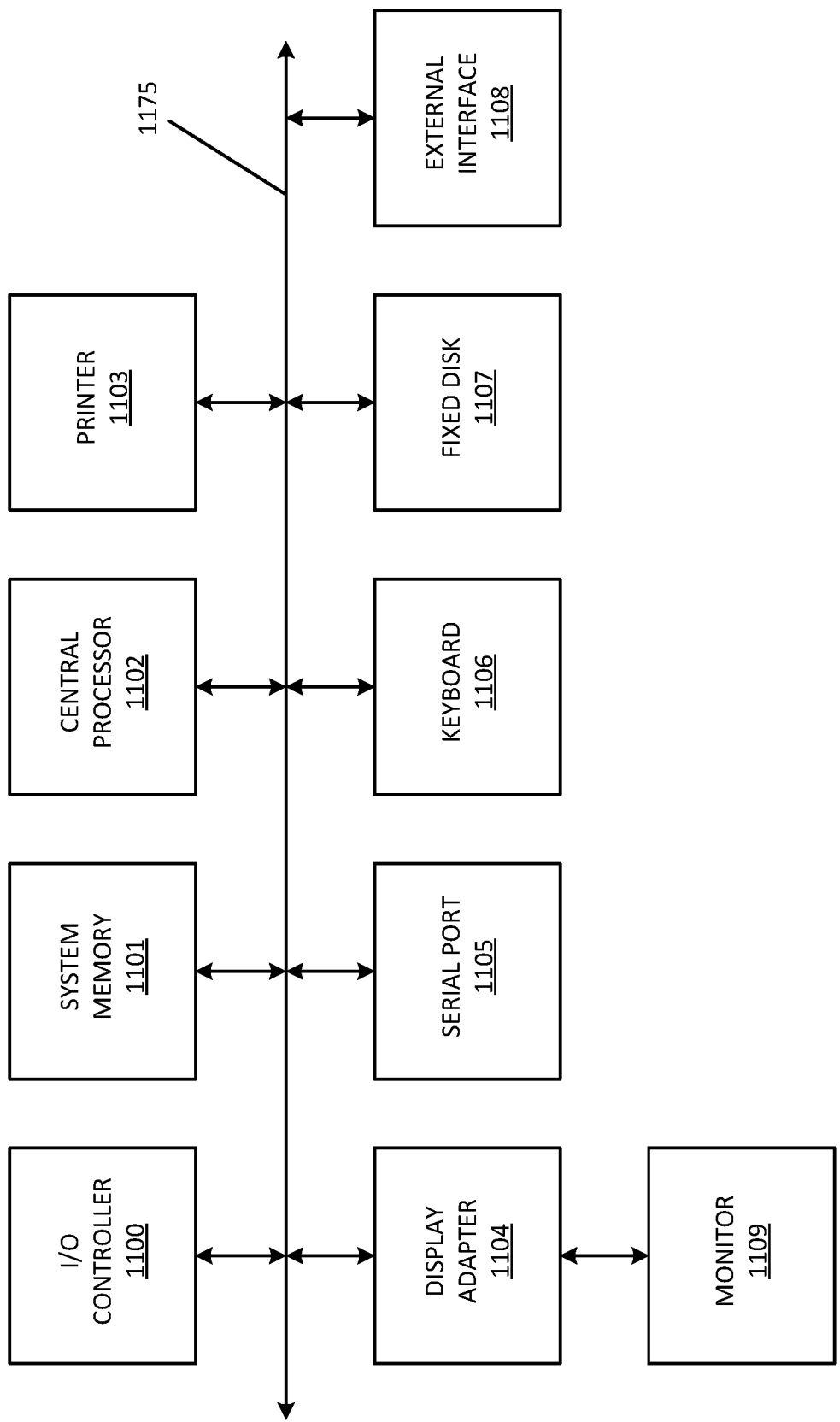
FIG. 11 illustrates is a high level block diagram of a computer system.

FIG. 11 illustrates is a high level block diagram of a computer system that may be used to implement any of the entities or components (e.g., toll payment server) described above, according to some embodiments. The subsystems shown in FIG. 11 are interconnected via a system bus 975. Additional subsystems include a printer 1103, keyboard 1106, fixed disk 1107, and monitor 1109, which is coupled to display adapter 1104. Peripherals and input/output (I/O) devices, which couple to I/O controller 1100, can be connected to the computer system by any number of means known in the art, such as a serial port. For example, serial port 1105 or external interface 1108 can be used to connect the computer apparatus to a wide area network such as the Internet, a mouse input device, or a scanner. The interconnection via system bus 975 allows the central processor 1102 to communicate with each subsystem and to control the execution of instructions from system memory 1101 or the fixed disk 1107, as well as the exchange of information between subsystems. The system memory 1101 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The asset obfuscation techniques described herein can provide tailored or customized obfuscation of digital assets (e.g., mobile applications) deployed to various mobile devices. By increasing the variance or difference among the deployed assets, the risk of massive or scalable security attacks can be mitigated. In particular, attackers are now required to build into their malware different solutions for each new upgrade or variation in security implementation, therefore increasing the size of the necessary malware, making it easier to identify and prevent. Such malware would also take more time and effort to develop, limiting the window for deployment. In addition, the size of the user communities affected by a successful attack can be decreased.

The above description is illustrative and is not restrictive. Many variations of the invention may become apparent to those skilled in the art upon review of the disclosure. The scope of the invention may, therefore, be determined not necessarily with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method comprising performing, by a first computer in a first high security zone of a first system:
   transmitting, over a network, a public key to be obtained by a second computer in a low security zone of a second system, wherein the public key corresponds to a private key associated with the first system, the first system comprising the first high security zone behind a first firewall and a first low security zone in front of the first firewall, the second system comprising a second high security zone behind a second firewall and a second low security zone in front of the second firewall;
   receiving, over the network, a key ID that identifies the public key;
   generating a first application programming interface (API) message that includes the key ID, wherein the first API message is a request for a service provided by the second system;
   obtaining data to be signed from the first API message, the data comprising a resource identifier corresponding to the service provided by the second system;
   generating a signature token by signing the data using a cryptographic algorithm and the private key associated with the first system, the generating comprising applying a hash function of the cryptographic algorithm to the data from the first API message, including the resource identifier, to obtain at least a portion of the signature token; and
   transmitting the first API message to the second computer in the low security zone of the second system, wherein the first API message invokes the service provided by the second system in a third computer of the second high security zone of the second system.

2. The method of claim 1, wherein the public key is transmitted to another computer from which the second computer retrieves the public key.

3. The method of claim 1, wherein the key ID is received from the second system and is configured to be used by the second computer to retrieve the public key for authenticating the first API message.

4. The method of claim 1, wherein the first API message is a response to an API request for a service provided by the first system, and wherein the API request is received by the first computer via a fourth computer in the first low security zone of the first system.

5. The method of claim 1, where the signed data includes only a portion of a header and/or body of the first API message.

6. The method of claim 1, further comprising:
   encrypting at least a portion of the first API message using a shared secret that is shared with a third fourth computer of the second high security zone of the second system.

7. The method of claim 6, wherein the fourth computer is configured to route a decrypted first API message to the third computer.

8. A first computer system, comprising:
   a first computer in a first high security zone of the first computer system, the first computer comprising one or more processors configured to:
   transmit, over a network, a public key to be obtained by a second computer in a low security zone of a second system, wherein the public key corresponds to a private key associated with the first computer system, the first computer system comprising the first high security zone behind a first firewall and a first low security zone in front of the first firewall, the second system comprising a second high security zone behind a second firewall and a second low security zone in front of the second firewall;
   receive, over the network, a key ID that identifies the public key;
   generate a first application programming interface (API) message that includes the key ID, wherein the first API message is a request for a service provided by the second system;
   obtain data to be signed from the first API message the data comprising a resource identifier corresponding to the service provided by the second system;
   generate a signature token by signing the data using a cryptographic algorithm and the private key associated with the first computer system, the generating comprising applying a hash function of the cryptographic algorithm to the data from the first API message, including the resource identifier, to obtain at least a portion of the signature token; and
   transmit the first API message to the second computer in the low security zone of the second system, wherein the first API message invokes the service provided by the second system in a third computer of the second high security zone of the second system.

9. The system of claim 8, wherein the public key is transmitted to another computer from which the second computer retrieves the public key.

10. The system of claim 8, wherein the key ID is received from the second system and is configured to be used by the second computer to retrieve the public key for authenticating the first API message.

11. The system of claim 8, wherein the first API message is a response to an API request for a service provided by the first computer system, and wherein the API request is received by the first computer via a fourth computer in the first low security zone of the first computer system.

12. The system of claim 8, wherein the signed data includes only a portion of a header and/or body of the first API message.

13. The system of claim 8, wherein the one or more processors of the first computer are further configured to encrypt at least a portion of the first API message using a shared secret that is shared with a fourth computer of the second high security zone of the second system.

14. One or more non-transitory computer-readable storage media storing a plurality of instructions that when executed cause one or more processors of a first computer in a first high security zone of a first system to perform:
   transmitting, over a network, a public key to be obtained by a second computer in a low security zone of a second system, wherein the public key corresponds to a private key associated with the first system, the first system comprising the first high security zone behind a first firewall and a first low security zone in front of the first firewall, the second system comprising a second high security zone behind a second firewall and a second low security zone in front of the second firewall;
   receiving, over the network, a key ID that identifies the public key;

generating a first application programming interface (API) message that includes the key ID, wherein the first API message is a request for a service provided by the second system;

obtaining data to be signed from the first API message the data comprising a resource identifier corresponding to the service provided by the second system;

generating a signature token by signing the data using a cryptographic algorithm and the private key associated with the first system, the generating comprising applying a hash function of the cryptographic algorithm to the data from the first API message, including the resource identifier, to obtain at least a portion of the signature token; and transmitting the first API message to the second computer in the low security zone of the second system, wherein the first API message invokes the service provided by the second system in a third computer of the second high security zone of the second system.

15. The one or more non-transitory computer-readable storage media of claim 14, wherein the public key is transmitted to another computer from which the second computer retrieves the public key.

16. The one or more non-transitory computer-readable storage media of claim 14, wherein the key ID is received from the second system and is configured to be used by the second computer to retrieve the public key for authenticating the first API message.

17. The one or more non-transitory computer-readable storage media of claim 14, wherein the first API message is a response to an API request for a service provided by the first system, and wherein the API request is received by the first computer via a fourth computer in the first low security zone of the first system.

18. The one or more non-transitory computer-readable storage media of claim 14, wherein the signed data includes only a portion of a header and/or body of the first API message.

19. The one or more non-transitory computer-readable storage media of claim 14, wherein the one or more processors of the first computer are further configured to encrypt at least a portion of the first API message using a shared secret that is shared with a fourth computer of the second high security zone of the second system.

20. The one or more non-transitory computer-readable storage media of claim 19, wherein the fourth computer is configured to route a decrypted first API message to the third computer.

* * * * *

UNITED STATES PATENT AND TRADEMARK OFFICE
CERTIFICATE OF CORRECTION

PATENT NO. : 11,088,853 B2
APPLICATION NO. : 16/182176
DATED : August 10, 2021
INVENTOR(S) : Minghua Xu, Jose Rios Trevino and Ying Hao Page 1 of 1

It is certified that error appears in the above-identified patent and that said Letters Patent is hereby corrected as shown below:

In the Claims

In Column 39, Line 55, Claim 6, please remove "a shared secret that is shared with a third fourth" and insert -- a shared secret that is shared with a fourth --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*